(12) United States Patent
Bai et al.

(10) Patent No.: US 9,629,003 B2
(45) Date of Patent: Apr. 18, 2017

(54) COMPUTING SYSTEM WITH FACTOR ESTIMATION MECHANISM AND METHOD OF OPERATION THEREOF

(71) Applicant: Samsung Electronics Co., Ltd., Suwon-si, Gyeonggi-Do (KR)

(72) Inventors: Dongwoon Bai, San Diego, CA (US); Jungwon Lee, San Diego, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 135 days.

(21) Appl. No.: 14/453,872

(22) Filed: Aug. 7, 2014

(65) Prior Publication Data

US 2015/0098408 A1    Apr. 9, 2015

Related U.S. Application Data

(60) Provisional application No. 61/887,877, filed on Oct. 7, 2013.

(51) Int. Cl.
*H04W 72/04* (2009.01)
*H04W 24/02* (2009.01)
*H04B 17/345* (2015.01)

(52) U.S. Cl.
CPC .......... *H04W 24/02* (2013.01); *H04B 17/345* (2015.01)

(58) Field of Classification Search
CPC ........................ H04W 24/02; H04W 72/0406
USPC .......................................... 370/329; 375/227
See application file for complete search history.

(56) References Cited

U.S. PATENT DOCUMENTS

| | | | | |
|---|---|---|---|---|
| 6,665,308 B1* | 12/2003 | Rakib | ................ | H03M 13/256 348/E7.07 |
| 6,744,821 B1* | 6/2004 | Van Acker | ........ | H04L 25/03159 375/260 |
| 6,807,227 B2* | 10/2004 | Chien | ................... | H04L 1/0002 375/219 |
| 7,496,164 B1* | 2/2009 | Mostafa | ............... | H04B 17/345 375/254 |
| 8,135,098 B2 | 3/2012 | Lee et al. | | |
| 8,208,587 B2 | 6/2012 | Chong et al. | | |
| 8,369,450 B2* | 2/2013 | Khan | ................... | H04L 5/0023 375/299 |
| 8,509,350 B2 | 8/2013 | Zhang et al. | | |

(Continued)

FOREIGN PATENT DOCUMENTS

WO    2023751 A1    9/2001

OTHER PUBLICATIONS

A.P.Dempster, N.M. Laird, and D.B. Rubin. "Maximum-likelihood from incomplete data via the em algorithm." J. Royal Statist. Soc. Ser. B., 39, 1977.
J.A. Fessler, A.O. Hero, "Space-alternating generalized expectation-maximization algorithm," Signal Processing, IEEE Transactions on, vol. 42, No. 10, pp. 2664-2677, Oct. 1994.

(Continued)

*Primary Examiner* — Parth Patel
(74) *Attorney, Agent, or Firm* — IP Investment Law Group

(57) ABSTRACT

A computing system includes: an inter-device interface configured to receive a receiver signal including a serving control information for representing a serving control signal communicated over a serving control channel; and a communication unit, coupled to the inter-device interface, configured to: generate a boosting factor estimate based on the receiver signal, and determine the serving control information from the receiver signal based on the boosting factor estimate.

18 Claims, 6 Drawing Sheets

(56) References Cited

U.S. PATENT DOCUMENTS

| | | | | |
|---|---|---|---|---|
| 8,599,972 | B2* | 12/2013 | Bottomley | H04B 1/712 329/320 |
| 2002/0146044 | A1* | 10/2002 | Esmailzadeh | H04B 1/7085 370/542 |
| 2003/0048800 | A1* | 3/2003 | Kilfoyle | H04B 1/7103 370/441 |
| 2009/0303900 | A1* | 12/2009 | Cho | H04L 1/0026 370/252 |
| 2010/0054354 | A1* | 3/2010 | Tosato | H04L 25/03898 375/260 |
| 2010/0061259 | A1* | 3/2010 | Larsson | H04L 1/0026 370/252 |
| 2010/0296567 | A1* | 11/2010 | Qiu | H04B 1/109 375/227 |
| 2010/0303162 | A1* | 12/2010 | Wang | H04L 5/0007 375/260 |
| 2011/0182385 | A1 | 7/2011 | Doan et al. | |
| 2012/0140670 | A1* | 6/2012 | Shimobayashi | H04L 5/0044 370/252 |
| 2014/0036808 | A1 | 2/2014 | Pelletier et al. | |
| 2014/0050182 | A1 | 2/2014 | Iwai et al. | |
| 2014/0092950 | A1* | 4/2014 | Khayrallah | H04B 7/0697 375/227 |
| 2014/0294127 | A1* | 10/2014 | Tang | H04B 1/7105 375/343 |
| 2014/0362954 | A1 | 12/2014 | Choi | |
| 2015/0110232 | A1* | 4/2015 | Ling | H04L 25/0206 375/371 |
| 2015/0304964 | A1* | 10/2015 | Larsson | H04W 52/346 455/522 |

OTHER PUBLICATIONS

J. Lee; D. Toumpakaris; W. Yu, "Interference Mitigation via Joint Detection," IEEE Journal on Selected Areas in Communications, vol. 29, No. 6, pp. 1172-1184, Jun. 2011.

"Enhancing LTE Cell-Edge Performance via PDCCH ICIC", http://www.fujitsu.com/downloads/TEL/fnc/whitepapers/Enhancing-LTE-Cell-Edge.pdf, Fujitsu, 2011.

Y.Fan and Mikko Valkama, "Efficient Control Channel Resource Allocation for VoIP in OFDMA-Based Packet Radio Networks", EURASIP Journal on Wireless Communications and Networking, vol. 2011, Article 712658, Hindawi Publishing, 2011.

"Base Station Analyzer LTE PHY Layer Measurement Guide", http://www.jdsu.com/productliterature/lte_phy_layer_measurement_guide.pdf, JDSU, Sep. 2011.

A.Kocian, I.Land, and B.Fleury, "Joint Channel Estimation, Partial Successive Interference Cancellation, and Data Decoding for DS-CDMA Based on the SAGE Algorithm", IEEE Transactions on Communications, vol. 55, No. 6, 1231-1241, Jun. 2007.

J.Fessler and A.Hero, "Space-Alternating Generalized EM Algorithms for Penalized Maximum-Likelihood Image Reconstruction", http://www.eecs.umich.edu/techreports/systems/cspl/cspl-286.pdf, University of Michigan, Communications & Signal Processing Laboratory, Feb. 1994.

D.Shutin, and B.Fleury, "Sparse Variational Bayesian SAGE Algorithm With Application to the Estimation of Multipath Wireless Channels", IEEE Transactions on Signal Processing, vol. 59, No. 8, Aug. 2011.

K.Kim and R.Iltis, "Joint Detection and Channel Estimation Algorithms for QS-CDMA Signals Over Time-Varying Channels", IEEE Transactions on Communications, vol. 50, No. 5, May 2002.

* cited by examiner

COMPUTING SYSTEM WITH FACTOR ESTIMATION MECHANISM AND METHOD OF OPERATION THEREOF

CROSS-REFERENCE TO RELATED APPLICATION(S)

This application claims the benefit of U.S. Provisional Patent Application Ser. No. 61/887,877 filed Oct. 7, 2013, and the subject matter thereof is incorporated herein by reference thereto.

TECHNICAL FIELD

An embodiment of the present invention relates generally to a computing system, and more particularly to a system with factor estimation mechanism.

BACKGROUND

Modern consumer and industrial electronics, especially devices such as cellular phones, navigations systems, portable digital assistants, and combination devices, are providing increasing levels of functionality to support modern life including mobile communication. Research and development in the existing technologies can take a myriad of different directions.

The increasing demand for information in modern life requires users to access information at any time, at increasing data rates. However, telecommunication signals used in mobile communication effectively experience various types of hindrances from numerous sources, as well as computational complexities rising from numerous possible formats for communicated information, which affect the quality and speed of the accessible data.

Thus, a need still remains for a computing system with factor estimation mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a computing system, including: an inter-device interface configured to receive a receiver signal including a serving control content for representing a serving control signal communicated over a serving control channel; and a communication unit, coupled to the inter-device interface, configured to: generate a boosting factor estimate based on the receiver signal, and determine the serving control content from the receiver signal based on the boosting factor estimate.

An embodiment of the present invention provides a method of operation of a computing system including: receiving a receiver signal including a serving control content for representing a serving control signal communicated over a serving control channel; generating a boosting factor estimate with a control unit based on the receiver signal; and determining the serving control content from the receiver signal based on the boosting factor estimate.

An embodiment of the present invention provides a non-transitory computer readable medium including instructions for operating a computing system including: receiving a receiver signal including a serving control content for representing a serving control signal communicated over a serving control channel; generating a boosting factor estimate based on the receiver signal; and determining the serving control content from the receiver signal based on the boosting factor estimate.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
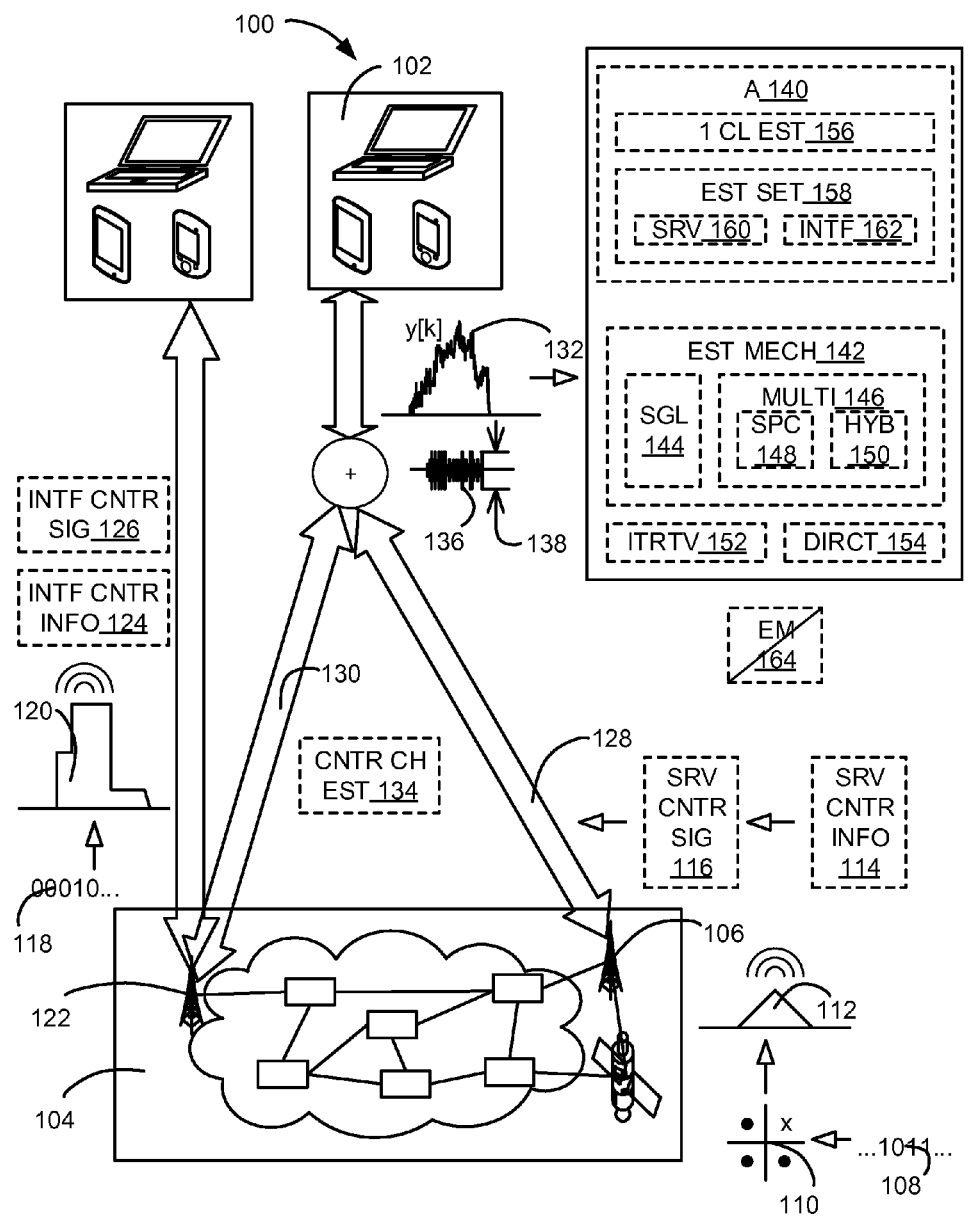
FIG. 1 is a computing system with factor estimation mechanism in an embodiment of the present invention.

The following embodiments of the present invention can be used to dynamically estimate a boosting factor for boosting a physical downlink control channel (PDCCH) signal power. The boosting factor can be estimated using an estimation mechanism, such as for communications involving one cell site or multiple cell sites.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The term "module" referred to herein can include or be implemented as software, hardware, or a combination thereof in the present invention in accordance with the context in which the term is used. For example, the software can be machine code, firmware, embedded code, and application software. The software can also include a function, a call to a function, a code block, or a combination thereof. Also for example, the hardware can be gates, circuitry, processor, computer, integrated circuit, integrated circuit cores, a pressure sensor, an inertial sensor, a microelectromechanical system (MEMS), passive devices, physical non-transitory memory medium having instructions for performing the software function, a portion therein, or a combination thereof.

The term "processing" as used herein includes manipulating signal and corresponding data, such as filtering, detecting, decoding, assembling data structures, transferring data structures, manipulating data structures, and reading and writing data structures. Data structures are defined to be information arranged as symbols, packets, blocks, files, input data, system generated data, such as calculated or generated data, and program data.

Referring now to FIG. 1, therein is shown a computing system 100 with factor estimation mechanism in an embodiment of the present invention. The computing system 100 includes a first device 102, such as a mobile device including a cellular phone or a notebook computer, connected to a network 104. The network 104 is a system of wired or wireless communication devices or means that are connected to each other for enabling communication between devices.

For example, the network 104 can include a combination of wires, transmitters, receivers, antennas, towers, stations, repeaters, telephone network, servers, or client devices for a wireless cellular network. The network 104 can also include a combination of routers, cables, computers, servers, and client devices for various sized area networks.

The computing system 100 can include a second device 106 for directly or indirectly linking and communicating with the first device 102. The network 104 can include the second device 106. The second device 106 can receive wireless signals from the first device 102, transmit signals to the first device 102, process signals, or a combination thereof. The second device 106 can also relay signals between other base stations, components within the network 104, or a combination thereof.

The first device 102 can be connected to the network 104 through the second device 106. For example, the second device 106 can be a base station, a router, a modem, or a combination thereof. Also for example, the second device 106 can be a communication device or a processing component included or with a cell tower, a wireless router, an antenna, or a combination thereof being used to communicate with, such as by sending signals to or receiving signals from, the first device 102 including a mobile computing device.

The first device 102 can connect to and communicate with other devices, such as other mobile devices, servers, computers, telephones, or a combination thereof. For example, the first device 102 can communicate with other devices by transmitting signals, receiving signals, processing signals, or a combination thereof and displaying a content of the signals, audibly recreating sounds according to the content of the signals, processing according to the content, such as storing an application or updating an operating system, or a combination thereof.

The second device 106 can be used to wirelessly exchange signals for communication, including voice signals of a telephone call or data representing a webpage and interactions therewith. The second device 106 can also transmit reference signals, training signals, error detection signals, error correction signals, header information, transmission format, protocol information, or a combination thereof.

Based on the communication method, such as code division multiple access (CDMA), orthogonal frequency-division multiple access (OFDMA), Third Generation Partnership Project (3GPP), Long Term Evolution (LTE), or fourth generation (4G) standards, the communication signals can include a reference portion, a header portion, a format portion, an error correction or detection portion, or a combination thereof imbedded in the communicated information. The reference portion, header portion, format portion, error correction or detection portion, or a combination thereof can include a predetermined bit, pulse, wave, symbol, or a combination thereof. The various portions can be embedded within the communicated signals at regular time intervals, frequency, code, or a combination thereof.

The second device 106 can communicate serving content 108 intended for the first device 102. The serving content 108 can include data from a transmitting device intended for communication by reproduction or processing at a receiving device. For example, the serving content 108 can be a sequence of bits intended for displaying, audibly recreating, executing instructions, storing, or a combination thereof at a receiving device, such as the first device 102.

The second device 106 can further utilize a transmission scheme 110, such as modulation-coding scheme (MCS), to communicate the serving content 108. The transmission scheme 110 is a mechanism for controlling transmission of information. The transmission scheme 110 can include controls for number of spatial streams, modulation type, coding rate, or a combination thereof.

The transmission scheme 110 can be for utilizing a constellation, a symbol-set, or a combination thereof to represent the serving content 108. The transmission scheme 110 can be for changing bits into symbols. For example, the transmission scheme 110 can include phase shift keying (PSK) modulation, amplitude modulation, frequency shift keying (FSK), or a derivative thereof.

For illustrative purposes, the computing system 100 will be described as using quadrature phase shift keying (QPSK) modulation for the transmission scheme 110 represented as $$\left\{ \frac{(1+j)}{\sqrt{2}}, \frac{(1-j)}{\sqrt{2}}, \frac{(-1+j)}{\sqrt{2}}, \frac{(-1-j)}{\sqrt{2}} \right\},$$

However, it is understood that the communication system 100 can use a variety of different modulation schemes, such as quadrature amplitude modulation (QAM) or binary PSK (BPSK).

The computing system 100 can use the transmission scheme 110 to transmit a serving signal 112 for communicating the serving content 108. The serving signal 112 can be data actually transmitted by a device for communication and having a format for transmission.

The computing system 100 can further communicate serving control information 114. The serving control information 114 is information regarding communication formats or processes used for communicating the serving signal 112. The serving control information 114 can be separate from or part of the serving signal 112. The serving control information 114 can be separate from the serving content 108.

For example, the serving control information 114 can describe or represent the transmission scheme 110 for the serving signal 112. Also for example, the serving control information 114 can describe or represent the transport format, resource allocation, repeat request, such as hybrid automatic repeat request (ARQ), or a combination thereof associated with the serving signal 112. As a more specific example, the serving control information 114 can include channel quality information (CQI), acknowledgement (ACK) or negative acknowledgement (NAK), scheduling request (SR), other associated information, or a combination thereof.

The serving control information 114 can be processed based on a corresponding instance of the transmission scheme 110. The computing system 100 can generate a serving control signal 116. The serving control signal 116 is actual transmitted information for communicating the control information for a targeted exchange of information between devices. The serving control signal 116 can be transmitted signal for communicating the serving control information 114 corresponding to the serving signal 112.

The serving control signal 116 can include the serving control information 114 or a derivation thereof. For example, the computing system 100 can include additional information, such as formatting or error correcting information, a symbol, a code word, rearranged information, or a combination thereof corresponding to the serving control information 114 in the serving control signal 116.

The serving signal 112, the serving control signal 116, or a combination thereof can be represented as 'x(n)'. The serving signal 112, the serving control signal 116, or a combination thereof can further include a reference portion. The reference portion can include a known signal transmitted by a device that is used to determine various types of information at a receiving device. The reference portion can include a bit, a symbol, a signal pattern, signal strength, frequency, phase, duration, or a combination thereof predetermined by the computing system 100, a standard, or a combination thereof. The details of the reference portion can be known and used by one or all devices in the computing system 100.

The reference portion can include generic information, cell-specific information, or a combination thereof. The reference portion can further include information regarding a transmission format. The detail, the structure, the content, or a combination thereof for the reference portion can be used by the receiving device, such as the first device 102, to determine information regarding a mechanism used to transmit data. The serving signal 112 can be based on single-input single output (SISO) communication scheme, a point-to-point communication scheme, or a multiple-input multiple-output (MIMO) communication scheme.

The computing system 100 can further include communication for interference content 118. The interference content 118 can include data from a transmitting device intended for communication by reproduction or processing at a device other than the receiving device. The interference content 118 can be similar to the serving content 108, but unintended for communication with the receiving device, such as the first device 102.

The computing system 100 can use the transmission scheme 110 same as or different from the serving signal 112 to generate an interference signal 120 from the interference content 118. The interference signal 120 can include data actually transmitted by a device for communication unintended with the receiving device and having a format for transmission. The interference signal 120 can be transmitted by an interference source 122.

The interference source 122 can include a device or a portion therein transmitting the interference signal 120 for communicating with a device different from the receiving device. The interference source 122 can include a base station, a server, a transmission tower, a router, a user device, a cell site, or a combination thereof separate from a device transmitting the serving signal 112, such as separate from the second device 106.

The interference source 122 can transmit the interference signal 120 for communicating with a further device separate from the receiving device. For example, the interference source 122 can transmit the interference signal 120 intending to communicate with a base station, a server, a transmission tower, a router, a user device, a cell site, or a combination thereof different from the first device 102.

The computing system 100 can further include interference control information 124 and an interference control signal 126 corresponding to the interference signal 120. The interference control information 124 is information regarding communication formats or processes used for communicating the interference signal 120. The interference control information 124 can be separate from or part of the interference signal 120. The interference control information 124 can be separate from the interference content 118.

The interference control information 124 can be similar to the serving control information 114, but corresponding to the interference signal 120 instead of the serving signal 112. For example, the interference control information 124 can describe or represent the transmission scheme 110 for the interference signal 120, the transport format, resource allocation, repeat request, such as hybrid automatic repeat request (ARQ), or a combination thereof associated therewith, or a combination thereof.

The interference control information 124 can be processed based on a corresponding instance of the transmission scheme 110. The computing system 100 can generate the interference control signal 126 for communicating the interference control information 124. The interference control signal 126 is actual transmitted information for communicating the control information for a targeted exchange of information between devices other than corresponding to the serving signal 112. The interference control signal 126 can be transmitted signal for communicating the interference control information 124 corresponding to the interference signal 120.

The interference control signal 126 can include the interference control information 124 or a derivation thereof. For example, the computing system 100 can include additional information, such as formatting or error correcting information, a symbol, a code word, rearranged information, or a combination thereof corresponding to the interference control information 124 in the interference control signal 126.

The transmitted signal can traverse a communication channel and be received at one or more devices. For example, the serving signal 112, the serving control signal 116, or a combination thereof can be transmitted by the second device 106, traverse a serving channel, and be received at the first device 102. Also for example, the interference signal 120, the interference control signal 126, or a combination thereof can be transmitted by the interference source 122, traverse an interference channel, and be received at the first device 102.

The communication channel can include a direct communication link between devices. For example, the communication channel can be wireless, wired, or a combination thereof.

As a more specific example, the communication channel can include communication frequency, time slot, packet designation, transmission rate, channel code, or a combination thereof used for transmitting signals between the first device 102, the second device 106, the interference source 122, intended interference recipient, or a combination thereof. Also as a more specific example, the communication channel can include an additive white Gaussian noise (AWGN) channel, a fading channel, or a combination thereof.

The communication channel can include a control channel, such as a physical downlink control channel (PDCCH), for communicating the control information. As a more specific example, the communication channel can include a serving control channel 128, an interference control channel 130, or a combination thereof.

The control channel, including the serving control channel 128 or the interference control channel 130, can be the communication channel specific for communicating control information. For example, the serving control channel 128 can include the control channel for communicating the serving control signal 116. Also for example, the interference control channel 130 can include control channel for communicating the interference control signal 126 but received at an unintended device.

As a more specific example, the serving control channel 128 can include PDCCH between the first device 102 and the second device 106 for communicating the serving control signal 116 corresponding to the serving signal 112. Also as a more specific example, the interference control channel 130 can include PDCCH between the interference source 122 and the first device 102 receiving the interference control signal 126, the interference signal 120, or a combination thereof intended for a different device.

One or more instances of transmitted signals can traverse corresponding instance of the communication channel and be received as receiver signal 132. The receiver signal 132 can include information received or detected by a specific device. For example, the receiver signal 132 can include information received or detected by the first device 102. Also for example, the receiver signal 132 can include information corresponding to the serving signal 112, the interference signal 120, the serving control signal 116, the interference control signal 126, or a combination thereof.

The receiver signal 132 can include the transmitted signal changed or altered from traversing the communication channel. The computing system 100 can calculate a channel estimate for representing the change or alteration in the originally transmitted signal caused by traversing the communication channel. The channel estimate can be for describing effects from a specific channel, a specific communication of data, a specific device combination, or a combination thereof.

For example, the channel estimate can represent fading, distortions or alterations from delayed signals or echoes, or a combination thereof accounting for a difference between a transmitted signal and a received signal. Also for example, the channel estimate can correspond to the serving channel, the interference channel, the serving control channel 128, the interference control channel 130, the serving signal 112, the interference signal 120, the serving control signal 116, the interference control signal 126, the first device 102, the second device 106, the interference source 122, or a combination thereof.

As a more specific example, the channel estimate can include a control channel estimate 134 for representing the effects of control channel for communication of control information. The computing system 100 can calculate the control channel estimate 134 as a serving channel estimate corresponding to the serving control channel 128, an interference channel estimate corresponding to the interference control channel 130, or a combination thereof.

The channel estimate can be based on the receiver signal 132, the reference portion therein, portions therein corresponding to independently transmitted signals, or a combination thereof. The channel estimate, including the control channel estimate 134 as, can be represented as 'h(n)'.

The computing system 100 can process the receiver signal 132 including a noise portion 136. The noise portion 136 can include error or deviations in the data. The noise portion 136 can be from a processing channel or a route for the data, hardware components processing signals, background noise, or a combination thereof. The noise portion 136 can also include changes in the signal or the data due to hardware component limitations, such as tolerance levels or cross-talk between components.

The noise portion 136 can be represented as 'z(n)'. The noise portion 136 can be based on various models or characterizations. For example, the noise portion 136 can be additive in nature and have a random Gaussian or Rayleigh distribution for the changes. Also for example, the noise portion 136 can be independent and identically distributed (i.i.d.) sequence of uncorrelated circularly symmetric complex Gaussian random vector with zero mean. Also for example, the noise portion 136 can include noise model mismatch or other types of noise models.

The noise portion 136 can be characterized by a noise measure 138. The noise measure 138 can include a quantitative representation of the noise portion 136. The noise measure 138 can be a statistical characteristic of the noise portion 136. The noise measure 138 can be a variance or a covariance value, a measure of spread, an expectation value, distancing, density, power, or a combination thereof for the noise portion 136. The noise measure 138 can be known or detectable to the computing system 100. The noise measure 138 can be represented as '$\sigma^2$' or '$E[|z(n)|^2]$'.

The receiver signal 132 can be represented as:

$$y(n)=Ah(n)x(n)+z(n). \quad \text{Equation (1).}$$

The term 'y(n)' can represent the receiver signal 132. The term 'x(n)' can represent the serving signal 112, the serving control signal 116, the interference signal 120, the interference control signal 126, or a combination thereof. The term 'h(n)' can represent the channel estimate of the communication channel corresponding to the term 'x(n)'.

For example, Equation (1) can be expanded to include multiple instances of communications. The receiver signal 132 can be represented in multiple signal environment as:

$$y(n)=\Sigma_{k=1,\ldots,K}A_i h_i(n)x_i(n)+z(n). \quad \text{Equation (2).}$$

The term 'n' can represent an index for instances of a bit, a code word, a symbol, a portion or a segment thereof, or a combination thereof ranging from 1 to a signal size, represented as 'N'. The term 'k' can represent a further index for instances of separate or independent communications ranging from 1 to a transmitter count, represented as 'K'. The term 'k' can represent separate or different transmissions, including the serving signal 112, the serving control signal 116, the interference signal 120, the interference control signal 126, or a combination thereof.

The term 'A' or '$A_i$' can represent a boost factor. The boost factor is a change in amplitude, intensity, power, or a combination thereof for the signal. For example, the boost factor can be a factor for boosting the PDCCH signal power. The computing system 100 can generate a boosting factor estimate 140 for approximating the boost factor. The boosting factor estimate 140 can be generated based on the receiver signal 132. The boosting factor estimate 140 can be represented as '$\hat{A}$' or '$\hat{A}_i$'.

The computing system 100 can use an estimation mechanism 142 to generate the boosting factor estimate 140. The estimation mechanism 142 is a process or a method for approximating the boost factor in the receiver signal 132.

The estimation mechanism 142 can include an equation, an instruction, a function, an operation, a threshold, supporting data, a sequence thereof, or a combination thereof for generating the estimation mechanism 142. The estimation mechanism 142 can be implemented using hardware, including passive devices or gates, software, including instructions or functions, firmware, stored information, such as in memory or configured in circuits, or a combination thereof. The estimation mechanism 142 can be predetermined by the computing system 100, based on a communication standard, or a combination thereof.

For example, the estimation mechanism 142 can include a single-cell mechanism 144, a multi-cell mechanism 146, or a combination thereof. The single-cell mechanism 144 is a method or a process for approximating the boost factor for one instance of communication between devices. The single-cell mechanism 144 can be for generating the boosting factor estimate 142 corresponding to one or more transmissions from a single instance of a transmitter.

As a more specific example, the single-cell mechanism 144 can be for generating the boosting factor estimate 142 corresponding to the second device 106, the serving signal 112 or the serving control signal 116 transmitted by the second device 106, or a combination thereof without consider signals from other transmitters. Also as a more specific example, the single-cell mechanism 144 can be for generating the boosting factor estimate 142 corresponding to the interference source 122, the interference signal 120 or the interference control signal 126 transmitted by the interference source 122, or a combination thereof without consider signals from other transmitters.

The multi-cell mechanism 146 is a method or a process for approximating the boost factor corresponding to multiple instances of communications between multiple sets of devices. The multi-cell mechanism 146 can be for generating the boosting factor estimate 142 corresponding to multiple transmissions from multiple transmitters. As a more specific example, the multi-cell mechanism 146 can be for generating the boosting factor estimate 142 corresponding to the second device 106 and the interference source 122, corresponding to the interference signal 120 and the serving signal 112, corresponding to the serving control signal 116 and the interference control signal 126, or a combination thereof.

The multi-cell mechanism 146 can be implemented in various ways. For example, the multi-cell mechanism 146 can include or utilize the single-cell mechanism 144. Also for example, the multi-cell mechanism 146 can include a space-alternating mechanism 148, a hybrid refinement mechanism 150, or a combination thereof.

The space-alternating mechanism 148 is a method or a process for generating the boosting factor estimate 140 corresponding to each and every individual instances of the transmitted signal within the receiver signal 132. For example, the space-alternating mechanism 148 can generate the boosting factor estimate 140, or a preliminary instance thereof, corresponding to the serving control signal 116, the interference control signal 126, or a combination thereof.

The hybrid refinement mechanism 150 is a method or a process for enhancing or improving the boosting factor estimate 140 corresponding to multiple transmitted signals. For example, the hybrid refinement mechanism 150 can be for generating or adjusting the boosting factor estimate 140, or a preliminary instance thereof, corresponding to the serving control signal 116, the interference control signal 126, or a combination thereof. Also for example, the hybrid refinement mechanism 150 can enhance or improve results of the space-alternating mechanism 148.

The estimation mechanism 142 can utilize various configurations. For example, the estimation mechanism 142 can include an iterative configuration 152, a direct-calculation configuration 154, or a combination thereof.

The iterative configuration 152 can include format for repeating a process, a method, or a combination thereof for producing for a result. The iterative configuration 152 can include the format for repeating an instruction, a calculation, an action, an effect, a set thereof, or a combination thereof. For example, the iterative configuration 152 can include a loop, recursion, a feed-back loop, or a combination thereof.

The direct-calculation configuration 154 can include the format for producing a result without repeating any process or method. The direct-calculation configuration 154 can represent the format without the iterative configuration 152. For example, one execution, one implementation, or one pass through a circuit can produce one instance of the result for the direct-calculation configuration 154. Also for example, multiple executions or a possible set of multiple executions, implementations, or passes through a circuit can produce one instance of the result for the iterative configuration 152.

The computing system 100 can use the direct-calculation configuration 154, the iterative configuration 152, or a combination thereof to generate the boosting factor estimate 140. For example, the single-cell mechanism 144, the multi-cell mechanism 146, or a combination thereof can be based on the direct-calculation configuration 154, the iterative configuration 152, or a combination thereof.

As a more specific example, the single-cell mechanism 144 can be based on the direct-calculation configuration 154 or without the iterative configuration 152. Also as a more specific example, the hybrid refinement mechanism 150 can be based on the direct-calculation configuration 154.

It has been discovered that the single-cell mechanism 144 based on the direct-calculation configuration 154 and without the iterative configuration 152 for generating the boosting factor estimate 140 provides reduced complexity and faster execution time. The single-cell mechanism 144 without the iterative configuration 152 can reduce the total number of operations or computations necessary to generate the boosting factor estimate 140.

It has also been discovered that the hybrid refinement mechanism 150 based on the direct-calculation configuration 154 and without the iterative configuration 152 for generating the boosting factor estimate 140 provides reduced complexity and faster execution time. The hybrid refinement mechanism 150 without the iterative configuration 152 can reduce the total number of operations or computations necessary to generate the boosting factor estimate 140.

The estimation mechanism 142 including the single-cell mechanism 144, the multi-cell mechanism 146, or a combination thereof can be used to generate the boosting factor estimate 140 corresponding to one or more instances of the transmitted signal. Details regarding the estimation mechanism 142 will be described below.

The computing system 100 can generate the boosting factor estimate 140 including a single-cell estimate 156, an estimate set 158, or a combination thereof. The single-cell estimate 156 is the boosting factor estimate 140 corresponding to one instance of the transmitted signal. For example, the single-cell estimate 156 can correspond to either the serving control signal 116 or the interference control signal 126.

The estimate set 158 is a collection or a grouping of instances of the boosting factor estimate 140 each corresponding to one instance of the transmitted signal for all transmitted signals associated with the receiver signal 132. The estimate set 158 can include multiple instances of the single-cell estimate 156 each corresponding to separate instance of communication, transmitted message, transmitter, cell site, base station, or a combination thereof.

For example, the estimate set 158 can include a serving factor estimate 160, an interference factor estimate 162, or a combination thereof. The serving factor estimate 160 can include the single-cell estimate 156 corresponding to the serving control signal 116, the serving signal 112, or a combination thereof in the receiver signal 132. The interference factor estimate 162 can include one or more instances of the single-cell estimate 156 corresponding to one or more instances of the interference control signal 126, the interference signal 120, or a combination thereof.

As a more specific example, the estimate set 158 can include the serving factor estimate 160 representing include the single-cell estimate 156 corresponding to the serving control signal 116. Also as a more specific example, the estimate set 158 can include one or more instances of the interference factor estimate 162 each corresponding to one instance of the interference control signal 126.

It has been discovered that the boosting factor estimate 140 corresponding to communication of control information over the control channel provides improved accuracy and efficiency in communication. The boosting factor estimate 140 can improve the accuracy in characterizing and identifying the receiver signal 132, which can improve the recovery of the serving content 108, the serving control information 114, or a combination thereof included in the receiver signal 132.

The computing system 100 can generate the boosting factor estimate 140 without utilizing an expectation maximization (EM) approach 164. The expectation maximization approach 164 is an iterative process or method for finding maximum likelihood or maximum a posteriori estimates for parameters.

The expectation maximization approach 164 can include an expectation step for creating a function for the expectation of a log-likelihood value evaluated using a current estimate of the parameters. The expectation maximization approach 164 can further include a maximization step for computing the parameters maximizing an expected log-likelihood from the expectation step.

The estimation mechanism 142 can include the method or the process for generating the boosting factor estimate 140 without utilizing or implementing the expectation maximization approach 164. For example, the single-cell mechanism 144 can be based on the direct-calculation configuration 154 without the iterative configuration 152 for generating the boosting factor estimate 140 without utilizing or implementing the expectation maximization approach 164.

Also for example, the hybrid refinement mechanism 150 can be based on the direct-calculation configuration 154 without the iterative configuration 152 for generating the boosting factor estimate 140 without utilizing or implementing the expectation maximization approach 164. Also for example, the space-alternating mechanism 148 can be based on the direct-calculation configuration 154, the iterative configuration 152, or a combination thereof for generating the boosting factor estimate 140 without utilizing or implementing the expectation maximization approach 164.

It has been discovered that the boosting factor estimate 142 generated the estimation mechanism 142 without using the expectation maximization approach 164 reduces the error with lower complexity for the computing system 100. The boosting factor estimate 142 can accurately characterize the receiver signal 132 for recovering the serving content 108, the serving control information 114, or a combination thereof. The estimation mechanism 142 without the expectation maximization approach 164 can be implemented without any iteration or reduced iterations compared to the expectation maximization approach 164, which can reduce the complexity of the system.

For illustrative purposes, the first device 102 is described as receiving and processing the receiver signal 132 corresponding to the serving signal 112 from the second device 106. However, it is understood that the computing system 100 can include the second device 106 receiving and processing the receiver signal 132 corresponding to the serving signal 112 from the first device 102.

Also for illustrative purposes, the computing system 100 is described as simultaneously processing up to two separate communications. However, it is understood that the computing system 100 can process additional communications, such as additional instances of the interference signal 120, interference control signal 126, or a combination thereof.

Figure 2:
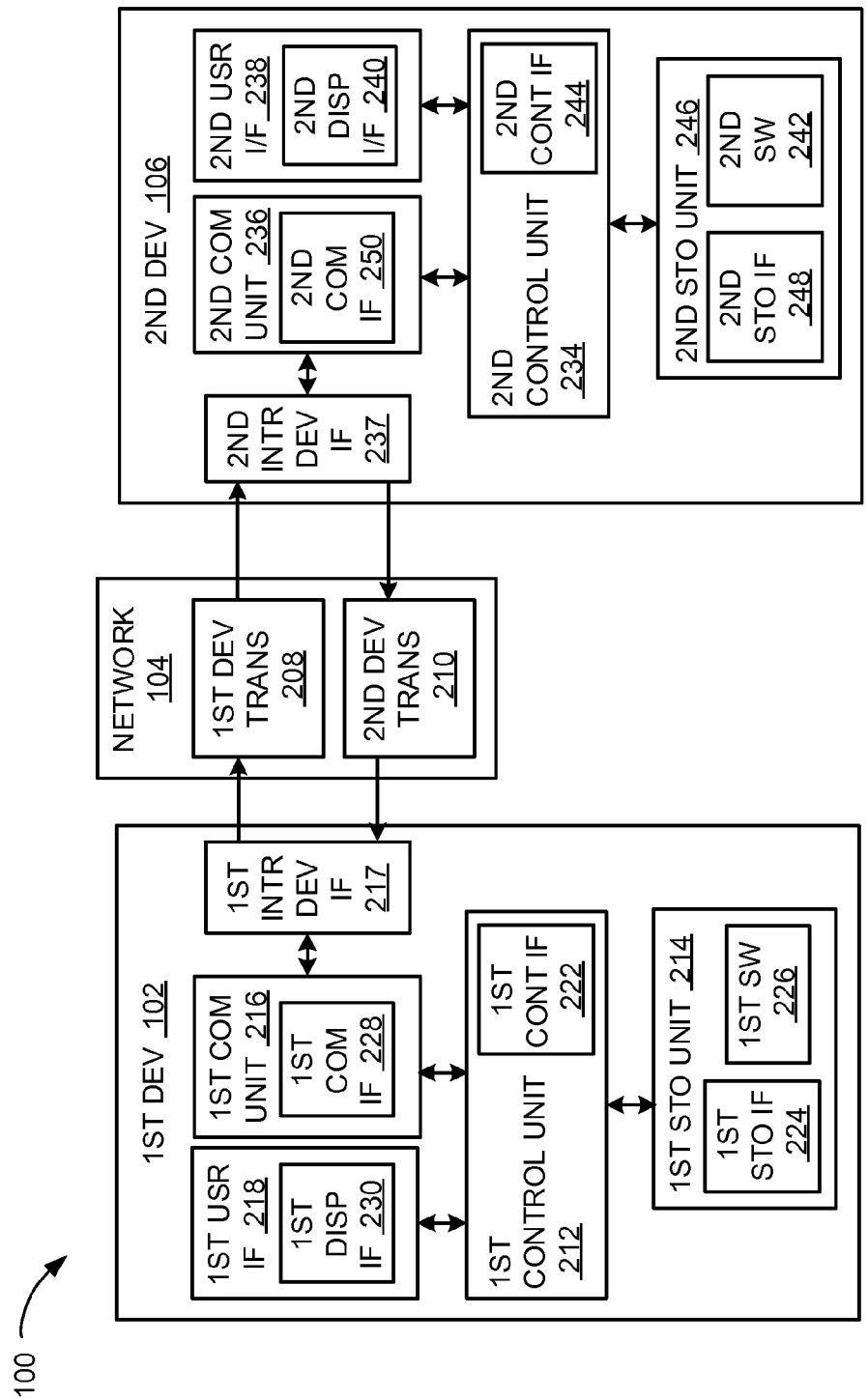
FIG. 2 is an exemplary block diagram of the computing system.

Referring now to FIG. 2, therein is shown an exemplary block diagram of the computing system 100. The computing system 100 can include the first device 102, the network 104, and the second device 106. The first device 102 can send information in a first device transmission 208 over the network 104 to the second device 106. The second device 106 can send information in a second device transmission 210 over the network 104 to the first device 102.

For illustrative purposes, the computing system 100 is shown with the first device 102 as a client device, although it is understood that the computing system 100 can have the first device 102 as a different type of device. For example, the first device 102 can be a server having a display interface.

Also for illustrative purposes, the computing system 100 is shown with the second device 106 as a server, although it is understood that the computing system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 212, a first storage unit 214, a first communication unit 216, and a first user interface 218. The first control unit 212 can include a first control interface 222. The first control unit 212 can execute a first software 226 to provide the intelligence of the computing system 100.

The first control unit 212 can be implemented in a number of different manners. For example, the first control unit 212 can be a processor, an application specific integrated circuit (ASIC) an embedded processor, a microprocessor, a hardware control logic, a hardware finite state machine (FSM), a digital signal processor (DSP), or a combination thereof. The first control interface 222 can be used for communication between the first control unit 212 and other functional units in the first device 102. The first control interface 222 can also be used for communication that is external to the first device 102.

The first control interface 222 can receive information from the other functional units or from external sources, or can transmit information to the other functional units or to external destinations. The external sources and the external destinations refer to sources and destinations external to the first device 102.

The first control interface 222 can be implemented in different ways and can include different implementations depending on which functional units or external units are being interfaced with the first control interface 222. For example, the first control interface 222 can be implemented with a pressure sensor, an inertial sensor, a microelectromechanical system (MEMS), optical circuitry, waveguides, wireless circuitry, wireline circuitry, or a combination thereof.

The first storage unit 214 can store the first software 226. The first storage unit 214 can also store the relevant information, such as data representing incoming images, data representing previously presented image, sound files, or a combination thereof.

The first storage unit 214 can be a volatile memory, a nonvolatile memory, an internal memory, an external memory, or a combination thereof. For example, the first storage unit 214 can be a nonvolatile storage such as non-volatile random access memory (NVRAM), Flash memory, disk storage, or a volatile storage such as static random access memory (SRAM).

The first storage unit 214 can include a first storage interface 224. The first storage interface 224 can be used for communication between the first storage unit 214 and other functional units in the first device 102. The first storage interface 224 can also be used for communication that is external to the first device 102.

The first storage interface 224 can receive information from the other functional units or from external sources, or can transmit information to the other functional units or to external destinations. The external sources and the external destinations refer to sources and destinations external to the first device 102.

The first storage interface 224 can include different implementations depending on which functional units or external units are being interfaced with the first storage unit 214. The first storage interface 224 can be implemented with technologies and techniques similar to the implementation of the first control interface 222.

The first communication unit 216 can enable external communication to and from the first device 102. For example, the first communication unit 216 can permit the first device 102 to communicate with the second device 106, a different device, an attachment, such as a peripheral device or a desktop computer, the network 104, or a combination thereof.

The first communication unit 216 can also function as a communication hub allowing the first device 102 to function as part of the network 104 and not limited to be an end point or terminal unit to the network 104. The first communication unit 216 can include active and passive components, such as microelectronics or an antenna, for interaction with the network 104.

The first communication unit 216 can include a baseband device or component, a modem, a digital signal processor, or a combination thereof for transmitting, formatting, receiving, detecting, decoding, further processing, or a combination thereof for communication signals. The first communication unit 216 can include one or more portions for processing the voltages, the currents, the digital information, or a combination thereof, such as an analog-to-digital converter, a digital-to-analog converter, a filter, an amplifier, a processor-type circuitry, or a combination thereof. The first communication unit 216 can further include one or more portions for storing information, such as cache or RAM memory, registers, or a combination thereof.

The first communication unit 216 can be coupled with a first inter-device interface 217. The first inter-device interface 217 can be a device or a portion of a device for physically communicating signals with a separate device. The first inter-device interface 217 can communicate by transmitting or receiving signals to or from another device. The first inter-device interface 217 can include one or more antennas for wireless signals, a physical connection and receiver-transmitter for wired signals, or a combination thereof. The first inter-device interface 217 can include an omnidirectional antenna, a wire, an antenna chip, a ceramic antenna, or a combination thereof. The first inter-device interface 217 can further include a port, a wire, a repeater, a connector, a filter, a sensor, or a combination thereof.

The first inter-device interface 217 can detect or respond to a power in electromagnetic waves and provide the detected result to the first communication unit 216 to receive a signal, including the second device transmission 210. The first inter-device interface 217 can provide a path or respond to currents or voltages provided by the first communication unit 216 to transmit a signal, including the first device transmission 208.

The first communication unit 216 can include a first communication interface 228. The first communication interface 228 can be used for communication between the first communication unit 216 and other functional units in the first device 102. The first communication interface 228 can receive information from the other functional units or can transmit information to the other functional units.

The first communication interface 228 can include different implementations depending on which functional units are being interfaced with the first communication unit 216. The first communication interface 228 can be implemented with technologies and techniques similar to the implementation of the first control interface 222.

The first user interface 218 allows a user (not shown) to interface and interact with the first device 102. The first user interface 218 can include an input device and an output device. Examples of the input device of the first user interface 218 can include a keypad, a touchpad, soft-keys, a keyboard, a microphone, an infrared sensor for receiving remote signals, or any combination thereof to provide data and communication inputs.

The first user interface 218 can include a first display interface 230. The first display interface 230 can include an output device. The first display interface 230 can include a display, a projector, a video screen, a speaker, or any combination thereof.

The first control unit 212 can operate the first user interface 218 to display information generated by the computing system 100. The first control unit 212 can also execute the first software 226 for the other functions of the computing system 100. The first control unit 212 can further execute the first software 226 for interaction with the network 104 via the first communication unit 216.

The second device 106 can be optimized for implementing an embodiment of the present invention in a multiple device embodiment with the first device 102. The second device 106 can provide the additional or higher performance processing power compared to the first device 102. The second device 106 can include a second control unit 234, a second communication unit 236, a second user interface 238, and a second storage unit 246.

The second user interface 238 allows a user (not shown) to interface and interact with the second device 106. The second user interface 238 can include an input device and an output device. Examples of the input device of the second user interface 238 can include a keypad, a touchpad, softkeys, a keyboard, a microphone, or any combination thereof to provide data and communication inputs. Examples of the output device of the second user interface 238 can include a second display interface 240. The second display interface 240 can include a display, a projector, a video screen, a speaker, or any combination thereof.

The second control unit 234 can execute a second software 242 to provide the intelligence of the second device 106 of the computing system 100. The second software 242 can operate in conjunction with the first software 226. The second control unit 234 can provide additional performance compared to the first control unit 212.

The second control unit 234 can operate the second user interface 238 to display information. The second control unit 234 can also execute the second software 242 for the other functions of the computing system 100, including operating the second communication unit 236 to communicate with the first device 102 over the network 104.

The second control unit 234 can be implemented in a number of different manners. For example, the second control unit 234 can be a processor, an embedded processor, a microprocessor, hardware control logic, a hardware finite state machine (FSM), a digital signal processor (DSP), or a combination thereof.

The second control unit 234 can include a second control interface 244. The second control interface 244 can be used for communication between the second control unit 234 and other functional units in the second device 106. The second control interface 244 can also be used for communication that is external to the second device 106.

The second control interface 244 can receive information from the other functional units or from external sources, or can transmit information to the other functional units or to external destinations. The external sources and the external destinations refer to sources and destinations external to the second device 106.

The second control interface 244 can be implemented in different ways and can include different implementations depending on which functional units or external units are being interfaced with the second control interface 244. For example, the second control interface 244 can be implemented with a pressure sensor, an inertial sensor, a microelectromechanical system (MEMS), optical circuitry, waveguides, wireless circuitry, wireline circuitry, or a combination thereof.

A second storage unit 246 can store the second software 242. The second storage unit 246 can also store the information such as data representing incoming images, data representing previously presented image, sound files, or a combination thereof. The second storage unit 246 can be sized to provide the additional storage capacity to supplement the first storage unit 214.

For illustrative purposes, the second storage unit 246 is shown as a single element, although it is understood that the second storage unit 246 can be a distribution of storage elements. Also for illustrative purposes, the computing system 100 is shown with the second storage unit 246 as a single hierarchy storage system, although it is understood that the computing system 100 can have the second storage unit 246 in a different configuration. For example, the second storage unit 246 can be formed with different storage technologies forming a memory hierarchal system including different levels of caching, main memory, rotating media, or off-line storage.

The second storage unit 246 can be a volatile memory, a nonvolatile memory, an internal memory, an external memory, or a combination thereof. For example, the second storage unit 246 can be a nonvolatile storage such as non-volatile random access memory (NVRAM), Flash memory, disk storage, or a volatile storage such as static random access memory (SRAM).

The second storage unit 246 can include a second storage interface 248. The second storage interface 248 can be used for communication between the second storage unit 246 and other functional units in the second device 106. The second storage interface 248 can also be used for communication that is external to the second device 106.

The second storage interface 248 can receive information from the other functional units or from external sources, or can transmit information to the other functional units or to external destinations. The external sources and the external destinations refer to sources and destinations external to the second device 106.

The second storage interface 248 can include different implementations depending on which functional units or external units are being interfaced with the second storage unit 246. The second storage interface 248 can be implemented with technologies and techniques similar to the implementation of the second control interface 244.

The second communication unit 236 can enable external communication to and from the second device 106. For example, the second communication unit 236 can permit the second device 106 to communicate with the first device 102 over the network 104.

The second communication unit 236 can also function as a communication hub allowing the second device 106 to function as part of the network 104 and not limited to be an end point or terminal unit to the network 104. The second communication unit 236 can include active and passive components, such as microelectronics or resistors, for interaction with the network 104.

The second communication unit 236 can include a baseband device or component, a modem, a digital signal processor, or a combination thereof for transmitting, formatting, receiving, detecting, decoding, further processing, or a combination thereof for communication signals. The second communication unit 236 can include one or more portions for processing the voltages, the currents, the digital information, or a combination thereof, such as an analog-todigital converter, a digital-to-analog converter, a filter, an amplifier, a processor-type circuitry, or a combination thereof. The second communication unit 236 can further include one or more portions for storing information, such as cache or RAM memory, registers, or a combination thereof.

The second communication unit 236 can be coupled with a second inter-device interface 237. The second inter-device interface 237 can be a device or a portion of a device for physically communicating signals with a separate device. The second inter-device interface 237 can communicate by transmitting or receiving signals to or from another device. The second inter-device interface 237 can include one or more antennas for wireless signals, a physical connection and receiver-transmitter for wired signals, or a combination thereof. The second inter-device interface 237 can include an omnidirectional antenna, a wire, an antenna chip, a ceramic antenna, or a combination thereof. The second inter-device interface 237 can further include a port, a wire, a repeater, a connector, a filter, a sensor, or a combination thereof.

The second inter-device interface 237 can detect or respond to a power in electromagnetic waves and provide the detected result to the second communication unit 236 to receive a signal, including the first device transmission 208. The second inter-device interface 237 can provide a path or respond to currents or voltages provided by the second communication unit 236 to transmit a signal, including the second device transmission 210.

The second communication unit 236 can include a second communication interface 250. The second communication interface 250 can be used for communication between the second communication unit 236 and other functional units in the second device 106. The second communication interface 250 can receive information from the other functional units or can transmit information to the other functional units.

The second communication interface 250 can include different implementations depending on which functional units are being interfaced with the second communication unit 236. The second communication interface 250 can be implemented with technologies and techniques similar to the implementation of the second control interface 244.

The first communication unit 216 can couple with the network 104 to send information to the second device 106 in the first device transmission 208. The second device 106 can receive information in the second communication unit 236 from the first device transmission 208 of the network 104.

The second communication unit 236 can couple with the network 104 to send information to the first device 102 in the second device transmission 210. The first device 102 can receive information in the first communication unit 216 from the second device transmission 210 of the network 104. The computing system 100 can be executed by the first control unit 212, the second control unit 234, or a combination thereof. For illustrative purposes, the second device 106 is shown with the partition having the second user interface 238, the second storage unit 246, the second control unit 234, and the second communication unit 236, although it is understood that the second device 106 can have a different partition. For example, the second software 242 can be partitioned differently such that some or all of its function can be in the second control unit 234 and the second communication unit 236. Also, the second device 106 can include other functional units not shown in FIG. 2 for clarity.

The functional units in the first device 102 can work individually and independently of the other functional units. The first device 102 can work individually and independently from the second device 106 and the network 104.

The functional units in the second device 106 can work individually and independently of the other functional units. The second device 106 can work individually and independently from the first device 102 and the network 104.

The functional units described above can be implemented in hardware. For example, one or more of the functional units can be implemented using the a gate, circuitry, a processor, a computer, integrated circuit, integrated circuit cores, a pressure sensor, an inertial sensor, a microelectromechanical system (MEMS), a passive device, a physical non-transitory memory medium having instructions for performing the software function, a portion therein, or a combination thereof.

For illustrative purposes, the computing system 100 is described by operation of the first device 102 and the second device 106. It is understood that the first device 102 and the second device 106 can operate any of the modules and functions of the computing system 100.

Figure 3:
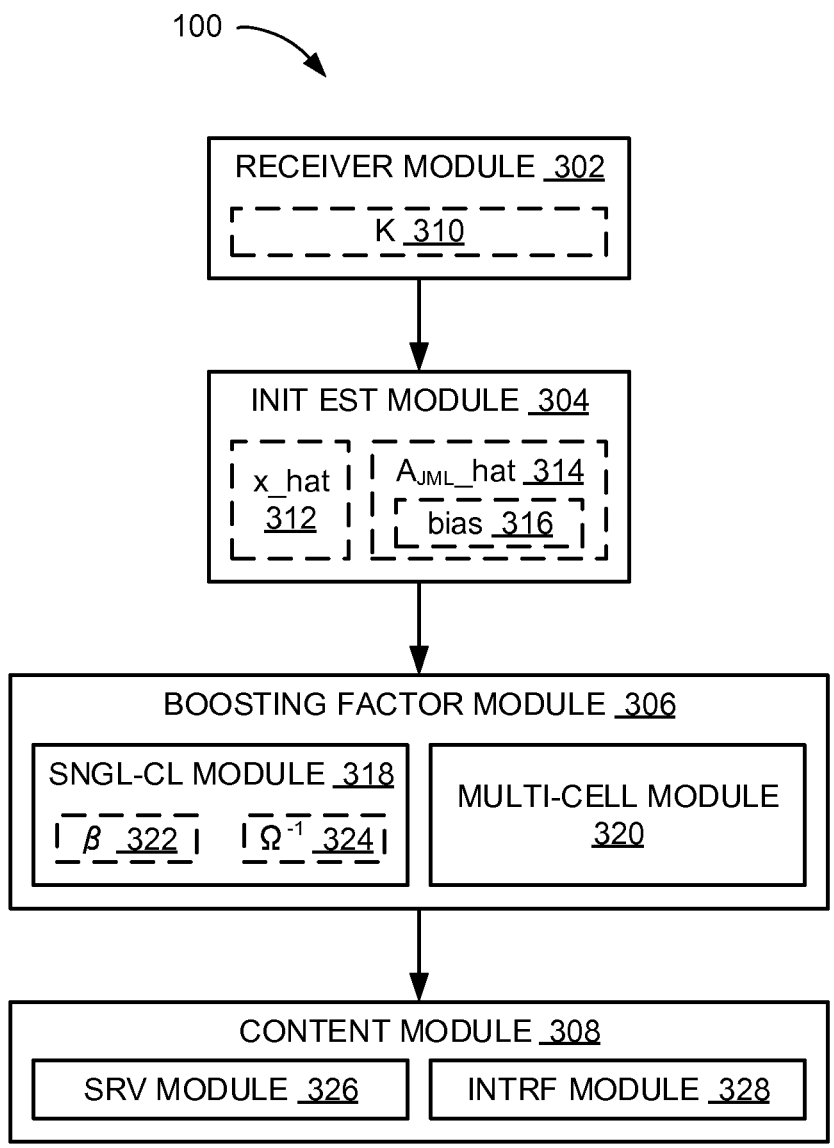
FIG. 3 is a control flow of the computing system.

Referring now to FIG. 3, therein is shown a control flow of the computing system 100. The computing system 100 can include a receiver module 302, an initial estimation module 304, a boosting factor module 306, a content module 308, or a combination thereof.

The receiver module 302 can be coupled with the initial estimation module 304. The initial estimation module 304 can be coupled with the boosting factor module 306, which can be further coupled to the content module 308.

The modules can be coupled to each other in a variety of ways. For example, modules can be coupled by having the input of one module connected to the output of another, such as by using wired or wireless connections, the network 104 of FIG. 1, instructional steps, process sequence, or a combination thereof. Also for example, the modules can be coupled either directly with no intervening structure other than connection means between the directly coupled modules, or indirectly with modules or devices other than the connection means between the indirectly coupled modules.

As a more specific example, one or more inputs or outputs of the receiver module 302 can be directly connected to one or more inputs or outputs of the initial estimation module 304 using conductors or the transmission channel without intervening modules or devices there-between. Also as a more specific example, the receiver module 302 can be coupled with the initial estimation module 304 indirectly using a repeater, a switch, a routing device, or a combination thereof there-between. The receiver module 302, the initial estimation module 304, the boosting factor module 306, the content module 308, or a combination thereof can be coupled directly or indirectly in similar ways.

The computing system 100 can communicate with or using a device, such as by displaying images, recreating sounds, exchanging process steps or instructions, or a combination thereof. The computing system 100 can communicate information between devices. The receiving device can further communicate with the user by displaying images, recreating sounds, exchanging process steps or instructions, or a combination thereof according to the information communicate to the device.

The receiver module 302 is configured to receive the receiver signal 132 of FIG. 1. The receiver module 302 can receive the receiver signal 132 corresponding to and representing the serving control signal 116 of FIG. 1, the interference control signal 126 of FIG. 1, or a combination thereof.

For illustrative purposes, the computing system 100 will be described as receiving the receiver signal 132 corresponding to and representing the serving control signal 116, the interference control signal 126, or a combination thereof. However, it is understood that the computing system 100 can receive and process the receiver signal 132 corresponding to and representing the serving signal 112 of FIG. 1, the interference signal 120 of FIG. 1, the serving control signal 116, the interference control signal 126, or a combination thereof.

The receiver module 302 can receive the receiver signal 132 as the serving control signal 116, the interference control signal 126, or a combination thereof respectively having traversed the serving control channel 128 of FIG. 1, the interference control channel 130 of FIG. 1, or a combination thereof. The receiver module 302 can receive the receiver signal 132 including symbols based on the transmission scheme 110 of FIG. 1, the symbols further corresponding to and representing the serving control information 114 of FIG. 1, the interference control information 124 of FIG. 1, or a combination thereof.

For example, the receiver module 302 can receive the receiver signal 132 including the serving control information 114 for representing the serving signal 112 communicated over the serving control channel 128. Also for example, the receiver module 302 can receive the receiver signal 132 at the first device 102 of FIG. 1 for representing the serving control signal 116 transmitted by the second device 106 of FIG. 1.

Also for example, the receiver module 302 can similarly receive the receiver signal 132 including the interference control information 124 for representing the interference signal 120 communicated over the interference control channel 130. Also for example, the receiver module 302 can receive the receiver signal 132 for representing the interference control signal 126 transmitted by the interference source 122 of FIG. 1.

The receiver module 302 can receive the receiver signal 132 by recording electrical power, voltage, current, or a combination thereof. For example, the receiver module 302 can receive the receiver signal 132 by recording energy levels or changes therein for the first inter-device interface 217 of FIG. 2, the second inter-device interface 237 of FIG. 2, the first communication interface 228 of FIG. 2, the second communication interface 250 of FIG. 2, the first control interface 222 of FIG. 2, the second control interface 244 of FIG. 2, or a combination thereof.

Also for example, the receiver module 302 can receive the receiver signal 132 by recording energy levels or changes received through a wireless antenna, a wire or a conductor, an instruction or a step for transferring data between devices, processes, instructions, between portions therein, or a combination thereof. Also for example, the receiver module 302 can record the receiver signal 132 by storing the energy levels or changes therein, according to a time, a sequence, or a combination thereof in the first communication unit 216 of FIG. 2, the second communication unit 236 of FIG. 2, the first storage unit 214 of FIG. 2, the second storage unit 246 of FIG. 2, or a combination thereof.

The receiver module 302 can process the receiver signal 132 to determine aspects thereof. For example, the receiver module 302 can determine a sample size, a sample index, a transmitter count 310, the reference portion for the serving signal 112 or the interference signal 120, the noise portion 136 of FIG. 1 or the noise measure 138 of FIG. 1, or a combination thereof. The receiver module 302 can determine the aspects of the receiver signal 132 based on a method or a process predetermined by the computing system 100 or a standard for controlling a sampling rate, a block size, a symbol size, or a combination thereof.

As a more specific example, the receiver module 302 can receive the receiver signal 132 including the noise portion 136 characterized by the noise measure 138. The receiver module 302 can identify the noise portion 136, analyze the noise portion 136 to calculate or determine the noise measure 138, or a combination thereof.

Also as a more specific example, the receiver module 302 can determine the transmitter count 310. The transmitter count 310 can be a total number or a quantity of separate communications, transmitted messages, signals from separate cells or base stations, or a combination thereof included in the receiver signal 132.

The transmitter count 310 can be at least one for corresponding to the serving signal 112, the second device 106 transmitting the signal, or a combination thereof. The transmitter count 310 can be more than one for corresponding to one or more instances the interference signal 120, the interference source 122 transmitting the signal, or a combination thereof. The transmitter count 310 can be more than one for corresponding to one or more instances the interference signal 120 or the source thereof in addition to the serving signal 112 or the second device 106, respectively. The transmitter count 310 can be represented as 'K'.

The receiver module 302 can further use a dedicated device, circuitry, process, or a combination thereof to determine the aspects of the receiver signal 132 including the noise portion 136, the noise measure 138, or a combination thereof. The receiver module 302 can also use known parts or aspects of the receiver signal 132 to further identify appropriate instance of the values for other aspects as predetermined and stored by the computing system 100. The receiver module 302 can further determine the noise measure 138 using a statistical analysis based on the noise portion 136, based on values predetermined by the computing system 100, or a combination thereof.

The receiver module 302 can determine the aspects of the receiver signal 132 using the first communication unit 216, the second communication unit 236, the first control unit 212 of FIG. 2, the second control unit 234 of FIG. 2, or a combination thereof. The receiver module 302 can store the aspects of the receiver signal 132 in the first communication unit 216, the second communication unit 236, the first storage unit 214, the second storage unit 246, or a combination thereof.

The receiver module 302 can further characterize the communication channel by calculating the channel estimate. For example, the receiver module 302 can calculate the control channel estimate 134 of FIG. 1 for characterizing the serving control channel 128, the interference control channel 130, or a combination thereof. The receiver module 302 can calculate the control channel estimate 134 based on the receiver signal 132 for representing the serving control channel 128, the interference control channel 130, or a combination thereof.

The receiver module 302 can use the reference portion associated with the serving signal 112, the interference signal 120, a portion in the receiver signal 132 corresponding thereto, or a combination thereof to calculate the control channel estimate 134. The details, formats, requirements, or a combination thereof regarding the reference portion, such as regarding original frequency, phase, content, shape, or a combination thereof, can be predetermined by the communication standard, the computing system 100, or a combination thereof.

The receiver module 302 can compare the received instances of the receiver signal 132 or segments therein to the predetermined parameters for the reference portion. The receiver module 302 can further use frequency domain transformation or time domain transformation, convolution, transposition, basic mathematical operations, or a combination thereof with the predetermined or received instances of the reference communication, or both.

The receiver module 302 can further calculate the changes in magnitude, frequency, phase, or a combination thereof in the reference portion in the serving control signal 116, the interference control signal 126, or a combination thereof to the receiver signal 132. The receiver module 302 can further use various methods, such as the least square method, the least mean square (LMS) method, or the minimum mean square error (MMSE) method, to calculate the control channel estimate 134 for characterizing the serving control channel 128, the interference control channel 130, or a combination thereof.

The receiver module 302 can use the first communication unit 216, the second communication unit 236, the first control unit 212, the second control unit 234, or a combination thereof to calculate control channel estimate 134. The receiver module 302 can store control channel estimate 134 in the first communication unit 216, the second communication unit 236, the first storage unit 214, the second storage unit 246, or a combination thereof.

After receiving the receiver signal 132 and determining the aspects thereof, the control flow can pass to the initial estimation module 304. The control flow can pass through a variety of ways. For example, control flow can pass by having processing results of one module passed to another module, such as by passing the receiver signal 132, the determined aspects thereof, or a combination thereof from the receiver module 302 to the initial estimation module 304, by storing the processing results at a location known and accessible to the other module, such as by storing the receiver signal 132, the determined aspects thereof, or a combination thereof at a storage location known and accessible to the initial estimation module 304, by notifying the other module, such as by using a flag, an interrupt, a status signal, or a combination for the initial estimation module 304, or a combination of processes thereof.

The initial estimation module 304 is configured to perform a preliminary estimate for content in the received signal. The initial estimation module 304 can provide initial estimates on boosting factor, represented as 'A', and signal represented as 'x(n)', or a combination thereof as represented in Equation (1). The initial estimation module 304 can perform the preliminary estimate by calculating an initial content estimate 312, an initial factor estimate 314, or a combination thereof.

The initial content estimate 312 can include a preliminary approximation of the serving control signal 116, the serving control information 114, the interference control signal 126, the interference control information 124, or a combination thereof. The initial factor estimate 314 can include a preliminary approximation of the boosting factor estimate 140 of FIG. 1 corresponding to the serving control signal 116, the interference control signal 126, or a combination thereof. For example, the initial factor estimate 314 can include a preliminary approximation for the single-cell estimate 156 of FIG. 1, the estimate set 158 of FIG. 1, the serving factor estimate 160 of FIG. 1 or the interference factor estimate 162 of FIG. 1 therein, or a combination thereof.

For example, the initial estimation module 304 can calculate the initial content estimate 312, the initial factor estimate 314, or a combination thereof based on:

$$\hat{A}_{JML} = \frac{\sum \text{Re}\{y(n)h^*(n)\hat{x}^*(n)\}}{\sum |h(n)|^2}.$$ Equation (3).

$$\hat{x}(n) = \text{argmin}_{x(n) \in C} \text{Re}\{y(n)h^*(n)x^*(n)\}.$$ Equation (4).

The initial content estimate 312 can be represented as '$\hat{x}(n)$'. The initial factor estimate 314 can be represented as '$\hat{A}_{JML}$'. The receiver signal 132 can be represented as 'y(n)'. The notation '*' can represent a complex conjugate of the corresponding element, such as the control channel estimate 134, the serving control signal 116, the serving control information 114, the interference control signal 126, the interference control information 124, an estimate thereof, or a combination thereof.

The initial estimation module 304 can calculate the initial content estimate 312, the initial factor estimate 314, or a combination thereof utilizing or for the estimation mechanism 142 of FIG. 1. For example, the initial estimation module 304 can calculate the initial content estimate 312, the initial factor estimate 314, or a combination thereof utilizing or for the single-cell mechanism 144 of FIG. 1, the multi-cell mechanism 146 of FIG. 1, or a combination thereof.

The initial estimation module 304 can jointly calculate the initial factor estimate 314 along with the initial content estimate 312, such as for representing the serving control information 114, according to Equations (3)-(4). Moreover, the initial estimation module 304 can calculate the initial content estimate 312, the initial factor estimate 314, or a combination thereof using a maximum likelihood (ML) approach according to Equations (3)-(4).

The initial estimation module 304 can calculate the initial factor estimate 314 including a factor bias 316. The factor bias 316 can include an inaccuracy or an error resulting from the calculation. The factor bias 316 can include a deviation from or a difference between the boost factor and the initial factor estimate 314.

The initial estimation module 304 can calculate the initial factor estimate 314 including the factor bias 316 based on inaccuracies inherent in the initial approximation process. The computing system 100 can calculate, reduce, remove, or a combination thereof for the factor bias 316 to generate the boosting factor estimate 140, details of which will be described below.

The initial estimation module 304 can use the first communication unit 216, the second communication unit 236, the first control unit 212, the second control unit 234, or a combination thereof for calculating the initial content estimate 312, the initial factor estimate 314, or a combination thereof. The initial estimation module 304 can store calculating the initial content estimate 312, the initial factor estimate 314, or a combination thereof in the first communication unit 216, the second communication unit 236, the first storage unit 214, the second storage unit 246, or a combination thereof.

After calculating the initial content estimate 312, the initial factor estimate 314, or a combination thereof, the control flow can be passed from the initial estimation module 304 to the boosting factor module 306. The control flow can pass similarly as described above between the receiver module 302 and the initial estimation module 304 but using processing results of the initial estimation module 304, such as the initial content estimate 312, the initial factor estimate 314, or a combination thereof.

The boosting factor module 306 is configured to generate the boosting factor estimate 140. The boosting factor module 306 generate the boosting factor estimate 140 based on the receiver signal 132, the initial content estimate 312, the initial factor estimate 314, or a combination thereof. For example, the boosting factor module 306 can further generate the boosting factor estimate 140 based on calculating, reducing, removing, or a combination thereof for the factor bias 316 from the initial factor estimate 314.

The boosting factor module 306 can generate the boosting factor estimate 140 without utilizing the expectation maximization approach 164 of FIG. 1 for generating the boosting factor estimate 140 from the receiver signal 132. For example, the boosting factor module 306 can include a single-cell module 318, a multi-cell module 320, or a combination thereof for generating the boosting factor estimate 140. The single-cell module 318, the multi-cell module 320, or a combination thereof can generate the boosting factor estimate 140 without utilizing the expectation maximization approach 164.

The single-cell module 318 can use the output of the initial estimate module 304, such as the initial content estimate 312, the initial factor estimate 314, or a combination thereof to generate the boosting factor estimate 140. The multi-cell module 320 can use the output of the initial estimation module 304 to generate the boosting factor estimate 140 or generate the boosting factor estimate 140 without utilizing the initial content estimate 312, the initial factor estimate 314, or a combination thereof.

The single-cell module 318 is configured to generate the boosting factor estimate 140 for one instance of communication corresponding to one instance of a transmitting device. The single-cell module 318 can generate the boosting factor estimate 140 based on the single-cell mechanism 144.

The single-cell module 318 can generate the boosting factor estimate 140 including the single-cell estimate 156, the serving factor estimate 160, the interference factor estimate 162, or a combination thereof. For example, the single-cell module 318 can generate the single-cell estimate 156 corresponding to the receiver signal 132 including only one instance of the serving control signal 116 or the interference control signal 126. Also for example, the single-cell module 318 can generate the single-cell estimate 156 corresponding to the serving control signal 116 for generating the serving factor estimate 160, corresponding to the interference control signal 126 for generating the interference factor estimate 162, or a combination thereof.

The single-cell module 318 can generate a linearization adjustment 322 for generating the boosting factor estimate 140. The linearization adjustment 322 is a modification or an alteration for simplifying multiple relationships. The linearization adjustment 322 can be for reducing dimensions within relationships, reducing inputs or outputs considered for the relationships, or a combination thereof. For example, the linearization adjustment 322 can be for adjusting available information to use one-dimensional relationship between input and output information to approximate multi-dimensional relationship between the input and the output information.

The single-cell module 318 can generate the linearization adjustment 322 based on the channel estimate, the noise portion 136, or a combination thereof. For example, the single-cell module 318 can generate the linearization adjustment 322 based on the control channel estimate 134, the noise measure 138, or a combination thereof according to the single-cell mechanism 144.

The single-cell module 318 can generate the linearization adjustment 322 based on:

$$\beta = \frac{\sum |h(n)|^2}{\sigma \sum |h(n)|}.$$ Equation (5).

Equation (5) can represent the single-cell mechanism 144 or a portion therein. The linearization adjustment 322 can be represented as '$\beta$'. The control channel estimate 134 can be represented as '$h(n)$'. The noise measure 138 or a derivative thereof can be represented as '$\sigma$'. The single-cell module 318 can generate the linearization adjustment 322 as a linearization coefficient.

The single-cell module 318 can further determine a measure magnification function 324. The measure magnification function 324 is a relationship describing characteristics associated with desired signal and undesirable components in the receiver signal 132. The single-cell module 318 can determine the measure magnification function 324 for representing the serving control information 114 relative to the noise portion 136.

For example, the measure magnification function 324 can be associated with performing signal-to-noise ratio (SNR) magnification. The measure magnification function 324 can represent a difference in the SNR between results of the joint estimation process for the initial estimation module 304 and the actual value.

The measure magnification function 324 can be associated with the linearization adjustment 322. The linearization adjustment 322 can be for reducing the complexity or dimensionality of the measure magnification function 324.

The single-cell module 318 can determine the measure magnification function 324 based on:

$$\Omega(x) = \sqrt{\frac{2}{\pi}} \exp\left(-\frac{1}{2}x^2\right) + x \, \text{erf}\left(\frac{x}{\sqrt{2}}\right).$$ Equation (6).

The measure magnification function 324 can be represented as '$\Omega(x)$' or '$\Omega^{-1}(x)$' with 'x' representing the sought signal or the information therein. For example, the term 'x' can represent the serving control signal 116, the serving control information 114, the interference control signal 126, the interference control information 124, or a combination thereof in the receiver signal 132 processed for with the single-cell mechanism 144. The function 'erf' can represent an error function.

The single-cell module 318 can determine the measure magnification function 324 using a variety of ways. For example, the single-cell module 318 can determine the measure magnification function 324 by calculating the measure magnification function 324 as described in Equation (6) as implemented with the single-cell mechanism 144. Also for example, the single-cell module 318 can determine the measure magnification function 324 based on a look up table predetermined by the computing system 100 as part of the single-cell mechanism 144 based on Equation (6).

The single-cell module 318 can generate the boosting factor estimate 140 including the single-cell estimate 156, the serving factor estimate 160, the interference factor estimate 162, or a combination thereof based on the linearization adjustment 322, the measure magnification function 324, or a combination thereof. The single-cell module 318 can further generate the boosting factor estimate 140 including the single-cell estimate 156, the serving factor estimate 160, the interference factor estimate 162, or a combination thereof based on removing the factor bias 316 from the initial factor estimate 314.

The single-cell module 318 can generate the boosting factor estimate 140 including the single-cell estimate 156, the serving factor estimate 160, the interference factor estimate 162, or a combination thereof according to the single-cell mechanism 144 based on the initial factor estimate 314, the linearization adjustment 322, the measure magnification function 324, or a combination thereof. The single-cell module 318 can generate the boosting factor estimate 140 based on:

$$\hat{A} = \beta^{-1}\Omega^{-1}(\beta \hat{A}_{JML}).$$  Equation (7).

The boosting factor estimate 140 can be represented as '$\hat{A}$'. The initial factor estimate 314 can be represented as '$\hat{A}_{JML}$'. The measure magnification function 324 can be represented as '$\Omega$', and the linearization adjustment 322 can be represented as '$\beta$'. The single-cell module 318 can generate the boosting factor estimate 140 by removing the factor bias 316 from the initial factor estimate 314 as described by Equation (7).

The single-cell module 318 can generate the boosting factor estimate 140 based on the direct-calculation configuration 154 of FIG. 1 and without the iterative configuration 152 of FIG. 1 for generating the boosting factor estimate 140 from the receiver signal 132. The single-cell module 318 can utilize the single-cell mechanism 144 based on the direct-calculation configuration 154 and without the iterative configuration 152 for generating the boosting factor estimate 140.

For example, the single-cell module 318 can generate the boosting factor estimate 140 based on removing the factor bias 316 from the initial factor estimate 314 using the linearization adjustment 322, the measure magnification function 324, or a combination thereof as described above. The single-cell module 318 can generate the boosting factor estimate 140 without repeating any portion of the process or method as described above for generating one instance of the boosting factor estimate 140.

The single-cell module 318 can generate the boosting factor estimate 140 using the first communication unit 216, the second communication unit 236, the first control unit 212, the second control unit 234, or a combination thereof. The single-cell module 318 can store the boosting factor estimate 140 in the first communication unit 216, the second communication unit 236, the first storage unit 214, the second storage unit 246, or a combination thereof.

The multi-cell module 320 is configured to generate the boosting factor estimate 140 for multiple communications corresponding to multiple transmitting devices. The multi-cell module 320 can generate the boosting factor estimate 140 including the estimate set 158 based on the multi-cell mechanism 146.

The multi-cell module 320 can generate the estimate set 158 including multiple values corresponding to the serving factor estimate 160, the interference factor estimate 162, or a combination thereof. For example, the multi-cell module 320 can generate the estimate set 158 including the serving factor estimate 160 along with one or more instances of the interference factor estimate 162. Also for example, the multi-cell module 320 can iteratively generate one instance of an estimate corresponding to one instance of a transmitter or transmitted message for all separate transmitters or transmitted messages included or represented in the receiver signal 132.

The multi-cell module 320 can generate intermediate values, refine values, or a combination thereof for generating the estimate set 158. The multi-cell module 320 can generate the estimate set 158 using the single-cell module 318, the single-cell mechanism 144, or a combination thereof. Details regarding the multi-cell module 320 will be described below.

It has been discovered that the boosting factor estimate 140 based on the initial factor estimate 314, the linearization adjustment 322 and the measure magnification function 324 provides a near optimal performance over all range of signal power of interest. The boosting factor estimate 140 based on the initial factor estimate 314, the linearization adjustment 322 and the measure magnification function 324 can accurately remove the factor bias 316 from the initial factor estimate 314 to accurately estimate the boost factor.

After generating the boosting factor estimate 140, the control flow can be passed from the boosting factor module 306 to the content module 308. The control flow can pass similarly as described above between the receiver module 302 and the initial estimation module 304 but using processing results of the boosting factor module 306, such as the boosting factor estimate 140.

The content module 308 is configured to process for the content of the originally intended message. The content module 308 can determine the serving control information 114, the interference control information 124, or a combination thereof based on the boosting factor estimate 140. The content module 308 can include a serving module 326, an interference module 328, or a combination thereof for determining the serving control information 114, the interference control information 124, or a combination thereof.

The content module 308 can process for the content based on variety of processes. For example, the content module 308 can detect, decode, rearrange, validate or error check, or a combination thereof for the serving control information 114, the interference control information 124, or a combination thereof. Also for example, the content module 308 can remove or reduce specific portions of the signal, such as for the serving control information 114, the interference control information 124, the serving signal 112, the interference signal 120, the noise portion 136, or a combination thereof.

The serving module 326 is configured to process for the serving control information 114 from the receiver signal 132. For example, the serving module 326 can detect, decode, rearrange, validate or error check, or a combination thereof for the serving control information 114 based on the receiver signal 132. Also for example, the serving module 326 can remove or reduce the interference control information 124, the interference signal 120, the noise portion 136, or a combination thereof from the receiver signal 132.

The interference module 328 is configured to process for the interference control information 124 from the receiver signal 132. For example, the interference module 328 can detect, decode, rearrange, validate or error check, or a combination thereof for the interference control information 124 based on the receiver signal 132. Also for example, the interference module 328 can remove or reduce the serving control information 114, the serving signal 112, other instances of the interference, the noise portion 136, or a combination thereof from the receiver signal 132.

The content module 308 can recover the serving control information 114, the interference control information 124, or a combination thereof based on the boosting factor estimate 140. The computing system 100 can use the serving control information 114, the interference control information 124, or a combination thereof for recovering and communicating the serving content 108 of FIG. 1, the interference content 118 of FIG. 1, or a combination thereof.

The computing system 100 can process for and utilize information regarding the interference signal 120 for communicating and processing the serving signal 112. For example, the computing system 100 can process for and utilize the interference control information 124, the interference content 118, or a combination thereof for communicating and recovering the serving content 108, the serving control information 114, or a combination thereof.

The content module 308 can use the first communication unit 216, the second communication unit 236, the first control unit 212, the second control unit 234, or a combination thereof to process for the content. The content module 308 can store content information in the first communication unit 216, the second communication unit 236, the first storage unit 214, the second storage unit 246, or a combination thereof.

The content module 308 can further use the first communication unit 216, the second communication unit 236, the first control unit 212, the second control unit 234, or a combination thereof to use or implement the communicated and recovered content. The content module 308 can further use the first user interface 218 of FIG. 2, the second user interface 238 of FIG. 2, the first communication unit 216, the second communication unit 236, or a combination thereof to communicate the communicated and recovered content to the user.

Figure 4:
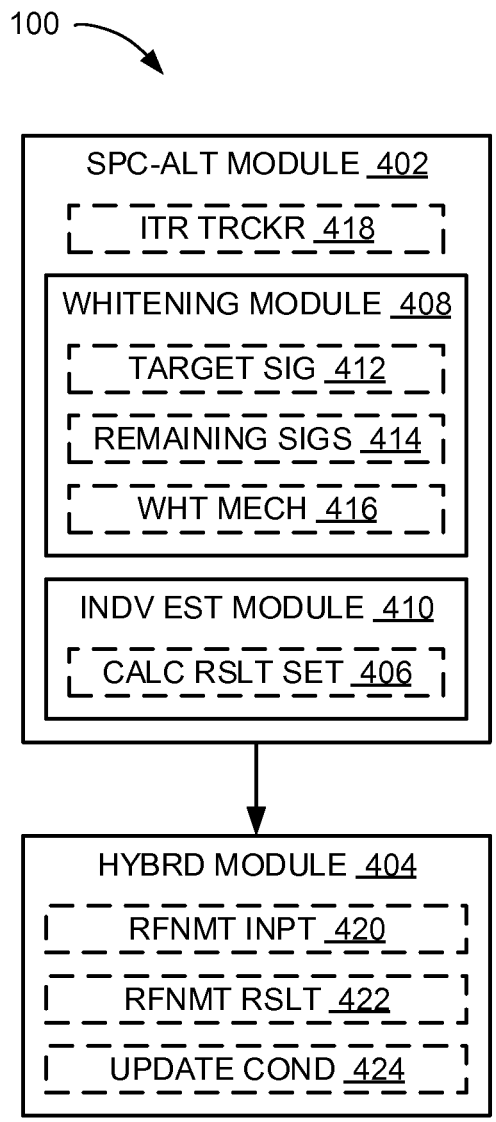
FIG. 4 is a detailed flow of the multi-cell module of FIG. 3.

Referring now to FIG. 4, therein is shown is a detailed flow of the multi-cell module 320 of FIG. 3. The multi-cell module 320 can generate the boosting factor estimate 142 of FIG. 1. The multi-cell module 320 can generate the boosting factor estimate 142 based on the multi-cell mechanism 146 of FIG. 1.

The multi-cell module 320 can generate the boosting factor estimate 142 corresponding to multiple signals originating from multiple transmitters. The multi-cell module 320 can generate the estimate set 158 of FIG. 1 including multiple values corresponding to the serving factor estimate 160 of FIG. 1, the interference factor estimate 162 of FIG. 1, or a combination thereof.

For example, the multi-cell module 320 can generate the estimate set 158 including the serving factor estimate 160 along with one or more instances of the interference factor estimate 162. Also for example, the multi-cell module 320 can iteratively generate one instance of an estimate corresponding to one instance of a transmitter or transmitted message for all separate transmitters or transmitted messages included or represented in the receiver signal 132 of FIG. 1.

The multi-cell module 320 can generate intermediate values, refine values, or a combination thereof for generating the estimate set 158. The multi-cell module 320 can generate the estimate set 158 using the single-cell module 318 of FIG. 3, the single-cell mechanism 144 of FIG. 1, or a combination thereof. The multi-cell module 320 can include a space-alternating module 402, a hybrid refinement module 404, or a combination thereof.

The space-alternating module 402 is configured to analyze individual signals within the receiver signal 132. The space-alternating module 402 can generate a calculation result set 406 as a transitional or intermediate instance of the boosting factor estimate 142 corresponding to the individual signals. The space-alternating module 402 can generate the calculation result set 406 including an intermediate result for the estimate set 158 including the serving factor estimate 160, the interference factor estimate 162, or a combination thereof.

The space-alternating module 402 can generate the calculation result set 406 based on the initial factor estimate 314 of FIG. 3. The space-alternating module 402 can further generate the calculation result set 406 based on isolating individual signals, generate the calculation result set 406 corresponding to the isolated individual signals, or a combination thereof. The space-alternating module 402 can include a whitening module 408, an individual estimation module 410, or a combination thereof.

The whitening module 408 is configured to isolate the individual signals. The whitening module 408 can isolate a target signal 412 by whitening remaining signals 414 excluding the target signal 412 or components thereof in the receiver signal 132.

The whitening module 408 can whiten the remaining signals 414 or components thereof based on a whitening mechanism 416. The whitening mechanism 416 can include a process or a method for isolating the target signal 412. The whitening mechanism 416 can be based on the remaining signals 414 excluding the target signal 412. For example, the whitening module 408 can whiten the remaining signals 414 based on the initial factor estimate 314, the control channel estimate 134 of FIG. 1, the noise measure 138 of FIG. 1, the receiver signal 132, or a combination thereof.

The whitening module 408 can isolate the target signal 412 based on the whitening mechanism 416 according to:

$$y_k(n) = y(n)/\sqrt{\Sigma_{j \neq k} |h_j(n)|^2 (\hat{A}_j)^2 + \sigma^2}. \qquad \text{Equation (8).}$$

The target signal 412 can be represented as '$y_k(n)$'. The whitening mechanism 416 can isolate the target signal 412 from the receiver signal 132 represented as '$y(n)$'.

The whitening module 408 can isolate the target signal 412 based on the initial factor estimate 314, represented as '$\hat{A}_j$', corresponding to the remaining signals 414, represented based on condition of '$j \neq k$'. The whitening module 408 can further isolate the target signal 412 based on the control channel estimate 134 corresponding to the remaining signals 414, represented as '$h_j(n)$'.

For example, the whitening module 408 can be for generating the calculation result set 406 corresponding to the estimate set 158 including the serving factor estimate 160 based on the whitening mechanism 416. The whitening module 408 can generate based on the whitening mechanism 416 for isolating the interference control signal 126 of FIG. 1 from within the receiver signal 132. Also for example, the whitening module 408 can similarly generate the calculation result set 406 with the target signal 412 corresponding to interference control signal 126 instead of the serving control signal 116 of FIG. 1.

The individual estimation module 410 is configured to generate the calculation result set 406 corresponding to the isolated instance of the target signal 412. For example, the individual estimation module 410 can generate the calculation result set 406 including a value corresponding to the target signal 412 using the single-cell mechanism 144, the single-cell module 318, or a combination thereof as described above.

For example, the individual estimation module 410 can generate the calculation result set 406 corresponding to the estimate set 158 based on the single-cell mechanism 144 utilizing the linearization adjustment 322 of FIG. 3, the measure magnification function 324 of FIG. 3, or a combination thereof. The individual estimation module 410 can generate the calculation result set 406 for generating the boosting factor estimate 142.

The space-alternating module 402 can isolate individual signals corresponding to the transmitter count 310 of FIG. 3 and generate the calculation result set 406 as intermediate instances of the boosting factor estimate 142 corresponding to the individual signals in the receiver signal 132. The space-alternating module 402 can include the iterative configuration 152 of FIG. 1 for generating the calculation result set 406. The space-alternating module 402 can generate the calculation result set 406 based on iteratively processing one instance of the serving control signal 116 or the interference control signal 126 at a time, for all transmitter signals in the receiver signal 132.

The space-alternating module 402 can iteratively isolate individual signals as the target signal 412. The space-alternating module 402 can assign an initial value to an iteration tracker 418. The space-alternating module 402 can isolate the target signal 412 corresponding to the iteration tracker 418, calculate the value corresponding to the target signal 412 for the calculation result set 406, or a combination thereof. The space-alternating module 402 can increment and iteratively repeat the above described process until all of the individual signals are isolated and analyzed as according to the transmitter count 310.

The space-alternating module 402 can isolate and generate without utilizing or implementing the expectation maximization approach 164 of FIG. 1. For example, the space-alternating module 402 can generate without the expectation step, the maximization step, or a combination thereof.

The space-alternating module 402 can use the first communication unit 216 of FIG. 2, the second communication unit 236 of FIG. 2, the first control unit 212 of FIG. 2, the second control unit 234 of FIG. 2, or a combination thereof to isolate the target signal 412, generate the calculation result set 406, or a combination thereof. The space-alternating module 402 can store the target signal 412, the calculation result set 406, or a combination thereof in the first communication unit 216, the second communication unit 236, the first storage unit 214 of FIG. 2, the second storage unit 246 of FIG. 2, or a combination thereof.

The hybrid refinement module 404 is configured to refine processing results for generating the boosting factor estimate 140 of FIG. 1. The hybrid refinement module 404 can refine processing results for multiple separate signals included in the receiver signal 132.

The hybrid refinement module 404 can refine processing results based on the calculation result set 406, the hybrid refinement mechanism 150 of FIG. 1, or a combination thereof. The hybrid refinement module 404 can generate the boosting factor estimate 140 including the estimate set 158 based on the calculation result set 406, the hybrid refinement mechanism 150 of FIG. 1, or a combination thereof for representing the boosting factor estimate 140 corresponding to the serving control signal 116 and the interference control signal 126.

The hybrid refinement module 404 can refine processing results by generating the boosting factor estimate 140. The hybrid refinement module 404 can generate the boosting factor estimate 140 including the estimate set 158. The hybrid refinement module 404 can include a refinement input 420, a refinement result 422, an update condition 424, or a combination thereof for generating the boosting factor estimate 140.

The refinement input 420 can include information used with the hybrid refinement mechanism 150 to generate the boosting factor estimate 140. For example, the refinement input 420 can include characteristics or attributes corresponding to the serving control signal 116, the interference control signal 126, the control channel estimate 134 corresponding thereto, the transmission scheme 110 or the symbol associated therewith, or a combination thereof.

The refinement result 422 can include a candidate or adjusted value resulting from using the hybrid refinement mechanism 150 for the boosting factor estimate 140. The refinement result 422 can be the boosting factor estimate 140 based on satisfying the update condition 424.

The hybrid refinement module 404 can use the hybrid refinement mechanism 150 to generate the boosting factor estimate 140 by making a hard decision on estimates for the serving control information 114 of FIG. 1. The hybrid refinement module 404 can making the hard decision as represented by:

$$(\hat{x}_1(n), \ldots, \hat{x}_K(n)) = \arg\min |y(n) - \Sigma_{k=1}^{K} A_k h_k(n) x_k(n)|. \quad \text{Equation (9).}$$

The hybrid refinement module 404 can use the hybrid refinement mechanism 150 to generate the refinement input 420 including a refinement signal, a refinement channel, a refinement scheme, or a combination thereof. The hybrid refinement module 404 can generate the refinement input 420 including the refinement signal, the refinement channel, the refinement scheme, or a combination thereof based on the hard decision, the receiver signal 132, the control channel estimate 134, or a combination thereof.

The hybrid refinement module 404 can generate the refinement input 420 including the refinement signal, the refinement channel, the refinement scheme, or a combination thereof based on the hybrid refinement mechanism 150 according to:

$$Y_k = \Sigma_{n=1}^{N} \text{Re}\{y^*(n) h_k(n) \hat{x}_k(n)\}. \quad \text{Equation (10).}$$

$$H_k = \Sigma_{n=1}^{N} |h_k(n)|^2. \quad \text{Equation (11).}$$

$$C_k = \Sigma_{n=1}^{N} \Sigma_{k'=1, k' \neq k}^{K} \text{Re}\{h_k(n) \hat{x}_k(n) h_{k'}^*(n) \hat{x}^*_{k'}(n)\}. \quad \text{Equation (12).}$$

The refinement signal can be represented by '$Y_k$', the refinement channel by '$H_k$', and the refinement scheme by '$C_k$'. The receiver signal 132 can be represented as 'y(n)', the control channel estimate 134 as '$h_k(n)$', and the hard decision for the signals as '$\hat{x}_k(n)$'.

The hybrid refinement module 404 can generate the refinement result 422 based on the refinement input 420 including the refinement signal, the refinement channel, the refinement scheme, or a combination thereof. The hybrid refinement module 404 can generate the refinement result 422 based on the refinement input 420 for representing the control channel estimate 134, the receiver signal 132, the transmission scheme 110, or a combination thereof.

The hybrid refinement module 404 can use the refinement input 420 to generate the refinement result 422 based on the hybrid refinement mechanism 150 according to:

$$\begin{bmatrix} \tilde{A}_1 \\ \tilde{A}_2 \\ \vdots \\ \tilde{A}_K \end{bmatrix} = \begin{bmatrix} H_1 & C_2 & \ldots & C_K \\ C_1 & H_2 & \ldots & \vdots \\ \vdots & \vdots & \ddots & \vdots \\ C_1 & \ldots & \ldots & H_K \end{bmatrix} \begin{bmatrix} Y_1 \\ Y_1 \\ \vdots \\ Y_K \end{bmatrix}. \quad \text{Equation (13).}$$

The refinement result 422 can be represented as '$\tilde{A}_1, \ldots \tilde{A}_K$' for a refined instance of the boosting factor estimate 140 corresponding to separate signals in the receiver signal 132.

The hybrid refinement module 404 can generate the boosting factor estimate 140 based on the refinement result 422, the calculation result set 406, or a combination thereof. The hybrid refinement module 404 can generate the boosting factor estimate 140 based the update condition 424 as implemented with the hybrid refinement mechanism 150.

The hybrid refinement module 404 can generate the boosting factor estimate 140 as the refinement result 422 or a value therein when the update condition 424 is satisfied. The hybrid refinement module 404 can generate the boosting factor estimate 140 as the calculation result set 406 or a value therein when the update condition 424 is not satisfied.

The update condition 424 can be based on the refinement result 422, the noise measure 138, signal size, the refinement input 420, or a combination thereof. For example, the update condition 424 can be represented as:

$$\frac{\tilde{A}_k^2 H_k}{N\sigma^2} > \gamma_k.$$   Equation (14).

The refinement result 422 can be represented as '$\tilde{A}_k$'. The refinement channel of the refinement input 420 can be represented as '$H_k$'. The signal size can be represented as 'N'. The update condition 424 can include a threshold represented as '$\gamma_k$'. The threshold can be based on modulation order of the transmission scheme 110.

The hybrid refinement module 404 can generate the boosting factor estimate 140 based on the direct-calculation configuration 154 of FIG. 1 and without the iterative configuration 152. The hybrid refinement module 404 can further generate the boosting factor estimate 140 without using the expectation maximization approach 164.

The hybrid refinement module 404 can use the first communication unit 216, the second communication unit 236, the first control unit 212, the second control unit 234, or a combination thereof to generate the boosting factor estimate 140. The hybrid refinement module 404 can store the boosting factor estimate 140 in the first communication unit 216, the second communication unit 236, the first storage unit 214, the second storage unit 246, or a combination thereof.

It has been discovered that the boosting factor estimate 140 based on the whitening mechanism 416 isolating the signals and the single-cell mechanism 144 utilizing the linearization adjustment 322 and the measure magnification function 324 provides a near optimal performance over all range of signal power of interest. The resulting instance of the boosting factor estimate 140 can accurately estimate the boost factor.

It has further been discovered that the boosting factor estimate 140 based on the hybrid refinement mechanism 150 utilizing the refinement input 420, the refinement result 422, and the update condition 424 provides a near optimal performance over all range of signal power of interest. The resulting instance of the boosting factor estimate 140 can accurately estimate the boost factor.

Figure 5:
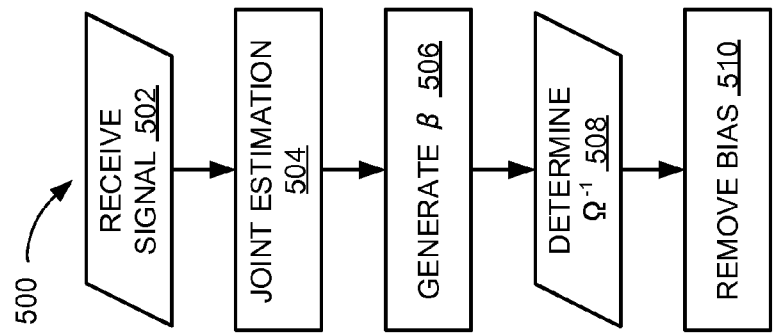
FIG. 5 is an exemplary operational flowchart of the computing system of FIG. 1.

Referring now to FIG. 5, therein is shown is an exemplary operational flowchart 500 of the computing system 100 of FIG. 1. The exemplary operational flowchart 500 or a portion therein can be for representing the single-cell mechanism 144 of FIG. 1.

The exemplary operational flowchart 500 can include receive signal in a box 502. The computing system 100 can receive signal by using the receiver module 302 of FIG. 3 to receive the receiver signal 132 of FIG. 1 at the first device 102 of FIG. 1 including the serving control signal 116 of FIG. 1, the interference control signal 126 of FIG. 1, or a combination thereof. Details of the receiver module 302 have been described above.

The exemplary operational flowchart 500 can include joint estimation in a box 504. The computing system 100 can perform the joint estimation by jointly calculating the initial factor estimate 314 of FIG. 3 along with the initial content estimate 312 of FIG. 3 using the initial estimation module 304 of FIG. 3. Details of the initial estimation module 304 have been described above.

The exemplary operational flowchart 500 can include generate β in a box 506. The computing system 100 can generate β by generating the linearization adjustment 322 of FIG. 3 with the boosting factor module 306 of FIG. 3. Details of the boosting factor module 306 have been described above.

The exemplary operational flowchart 500 can include determine $\Omega^{-1}$ in a box 508. The computing system 100 can determine $\Omega^{-1}$ by determining the measure magnitude function 324 of FIG. 3 with the boosting factor module 306. Details of the boosting factor module 306 have been described above.

The exemplary operational flowchart 500 can include remove bias in a box 510. The computing system 100 can remove bias by removing the factor bias 316 of FIG. 3 from the initial factor estimate 314 based on the linearization adjustment 322, the measure magnitude function 324, or a combination thereof. The computing system 100 can remove bias using the boosting factor module 306, which has been described in detail above.

Figure 6:
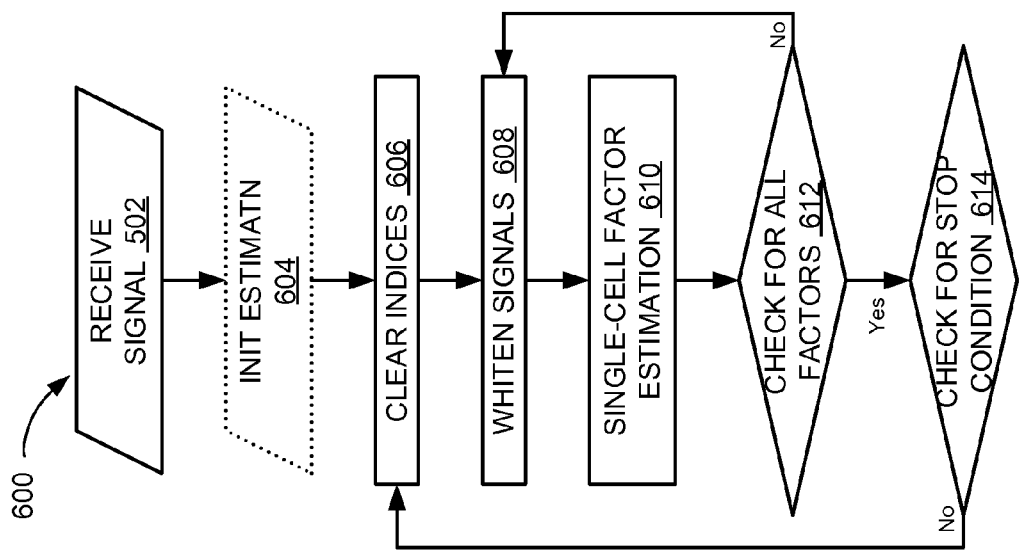
FIG. 6 is a further exemplary operational flowchart of the computing system of FIG. 1.

Referring now to FIG. 6, therein is shown is a further exemplary operational flowchart 600 of the computing system 100 of FIG. 1. The further exemplary operational flowchart 600 or a portion therein can be for representing the multi-cell module 320 of FIG. 1 or the space-alternating mechanism 148 of FIG. 1 therein.

The further exemplary operational flowchart 600 can include receive signal in the box 502 as described above in FIG. 5. The further exemplary operational flowchart 600 can further include initial estimation in a box 604. For an alternative embodiment of the exemplary operational flow chart 600, the initial estimation represented in the box 604 can be optional or excluded.

The box 604 can be similar to the box 504 of FIG. 5, but specifically for estimating multiple signals, channels, content, or a combination thereof. For example, the computing system 100 can use the initial estimation module 304 of FIG. 3 to produce initial estimates, including the initial content estimate 312 of FIG. 3, the initial factor estimate 314 of FIG. 3, or a combination thereof, corresponding to multiple separately transmitted signals, such as the serving control signal 116 of FIG. 1, the interference control signal 126 of FIG. 1, or a combination thereof. Details regarding the initial estimation module 304 have been described above.

The further exemplary operational flowchart 600 can include clear indices in a box 606. The computing system 100 can use the multi-cell module 320 of FIG. 3 or the space-alternating module 402 of FIG. 4 therein to clear indices. The computing system 100 can clear various instances of the iteration tracker 418 of FIG. 4 used for generating the boosting factor estimate 140 of FIG. 1, such as 'n', 'i', 'k', or a combination thereof as shown above in various equations.

The further exemplary operational flowchart 600 can include whiten signals in a box 608. The computing system 100 can use the whitening module 408 of FIG. 4 to whiten signals. The whitening module 408 can whiten the remaining signals 414 of FIG. 4 to process for the target signal 412 of FIG. 4. The whitening module 408 can perform whitening based on the latest estimates on boosting factors to whiten the noise portion 136 of FIG. 1 plus the remaining signals 414 except the target signal 412 of interest represented as the 'k'th signal for generating the boosting factor estimate 140. Details regarding the whitening module 408 have been described above.

The further exemplary operational flowchart 600 can include single-cell factor estimation in a box 610. The computing system 100 can use the individual estimation module 410 of FIG. 4 for the single-cell factor estimation. The individual estimation module 410 can generate the single-cell estimate 156 of FIG. 1 corresponding to the target signal 412 isolated with the whitening module 408.

The individual estimation module 410 can perform the single-cell mechanism 144 of FIG. 1 for 'k'th signal represented by the target signal 412 assuming the rest follows Gaussian distribution specified by latest estimates for the boosting factor estimate 140. The individual estimation module 410 can generate the single-cell estimate 156 of FIG. 1 for generating the serving factor estimate 160 of FIG. 1, the interference factor estimate 162 of FIG. 1, or a combination thereof. Details regarding the individual estimation module 410 or similarly the single-cell module 318 of FIG. 3 have been described above.

The further exemplary operational flowchart 600 can include check for all factors in a box 612. The computing system 100 can use the space-alternating module 402 or the individual estimation module 410 therein to check for all factors. The computing system 100 can check for all factors by verifying that approximations for all separate signals have been processed for the boosting factor estimate 140 or an instance thereof. The computing system 100 can check by comparing the iteration tracker 418 with an iteration threshold, such as the transmitter count 310 of FIG. 3.

The computing system 100 can increment the iteration tracker 418 and pass the control flow to the whitening module 408 to whiten signals as shown in the box 608 for a different instance of the target signal 412 until all instances of boosting factors have been estimated. The computing system 100 can include the iterative configuration 152 of FIG. 1 to iteratively select the target signal 412 for analyzing all instances of the separately transmitted signals in the receiver signal 132 of FIG. 1.

The further exemplary operational flowchart 600 can include check for stop condition in a box 614. The computing system 100 can further check for stop condition by testing a stopping criterion predetermined by the computing system 100. The stopping criterion can be based on a predetermined threshold, condition, situation, range, or a combination thereof.

The computing system 100 can generate the calculation result set 406 of FIG. 4 when the stopping criterion has been satisfied. The computing system 100 can further use the space-alternating module 402 to clear all instances of the iteration tracker 418 and repeat the above process when the stopping criterion is not satisfied. The computing system 100 can utilize the iterative configuration 152 for passing the control flow and repeating the above process as represented by a feedback line from the box 614 to the box 606.

Figure 7:
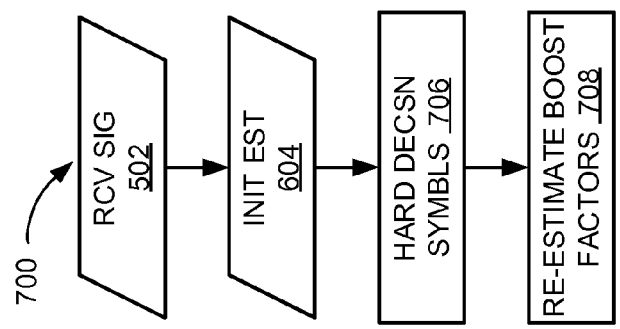
FIG. 7 is an additional exemplary operational flowchart of the computing system of FIG. 1.

Referring now to FIG. 7, therein is shown an additional exemplary operational flowchart 700 of the computing system 100 of FIG. 1. The additional exemplary operational flowchart 700 or a portion therein can be for representing the multi-cell mechanism 146 of FIG. 1 or the hybrid refinement mechanism 150 of FIG. 1 therein.

The additional exemplary operational flowchart 700 can include receive signal in the box 502 as described above in FIG. 5. The additional exemplary operational flowchart 700 can further include initial estimation in the box 604 as described above in FIG. 6.

The additional exemplary operational flowchart 700 can include hard decision for symbols in a box 706. The computing system 100 can use the hybrid refinement module 404 of FIG. 4 to make the hard decision for symbols. The hybrid refinement module 404 can make the hard decision on modulation symbols as described above.

The additional exemplary operational flowchart 700 can include re-estimate boost factors in a box 708. The computing system 100 can use the hybrid refinement module 404 to re-estimate boost factors. The hybrid refinement module 404 can re-estimate boosting factors based on detected modulation symbols resulting from the hard decision.

The hybrid refinement module 404 can generate the refinement result 422 of FIG. 4 from the refinement input 420 of FIG. 4, generate the boosting factor estimate 140 of FIG. 1 based on the refinement result 422, the calculation result set 406 of FIG. 4, the update condition 424 of FIG. 4, or a combination thereof, or a combination of processes thereof. Details regarding the hybrid refinement module 404 have been described above.

Figure 8:
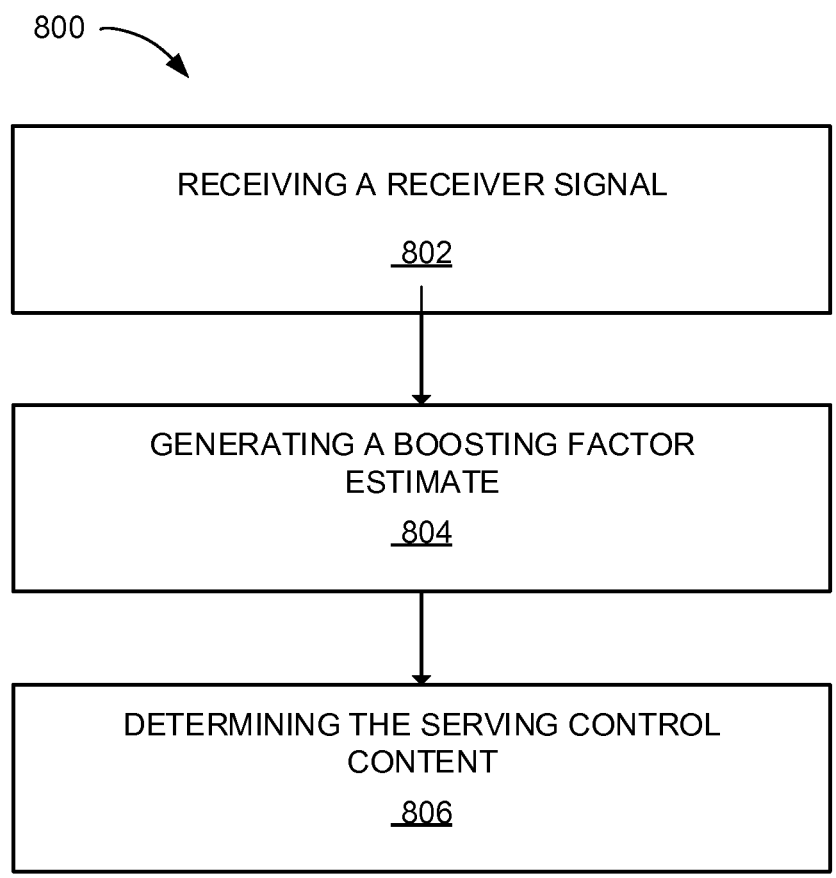
FIG. 8 is a flow chart of a method of operation of a computing system in a further embodiment of the present invention.

Referring now to FIG. 8, therein is shown a flow chart 800 of a method of operation of a computing system in a further embodiment of the present invention. The method 800 includes: receiving a receiver signal for including a serving control content for representing a serving control signal communicated over a serving control channel in a block 702; generating a boosting factor estimate with a communication unit based on the receiver signal in a block 704; and determining the serving control content from the receiver signal based on the boosting factor estimate in a block 706.

The modules described in this application can be hardware implementation or hardware accelerators, including passive circuitry, active circuitry, or both, in the first communication unit 216 of FIG. 2, the second communication unit 236 of FIG. 2, the first control unit 212 of FIG. 2, the second control unit 238 of FIG. 2, or a combination thereof. The modules can also be hardware implementation or hardware accelerators, including passive circuitry, active circuitry, or both, within the first device 102 of FIG. 1, the second device 106 of FIG. 1, or a combination thereof but outside of the first communication unit 216, the second communication unit 236, the first control unit 212, the second control unit 234, or a combination thereof.

The computing system 100 of FIG. 1 has been described with module functions or order as an example. The computing system 100 can partition the modules differently or order the modules differently. For example, initial estimation module 304 of FIG. 3 and the boosting factor module 306 of FIG. 3 can be combined. As for example, the channel estimation and receiver functions of the receiver module 302 of FIG. 3 can be separated into separate modules.

For illustrative purposes, the various modules have been described as being specific to the first device 102, the second device 106, or a combination thereof. However, it is understood that the modules can be distributed differently. For example, the various modules can be implemented in a different device, or the functionalities of the modules can be distributed across multiple devices. Also as an example, the various modules can be stored in a non-transitory memory medium.

As a more specific example, one or more modules described above can be stored in the non-transitory memory medium for distribution to a different system, a different device, a different user, or a combination thereof, for manufacturing, or a combination thereof. Also as a more specific example, the modules described above can be implemented or stored using a single hardware unit, such as a chip or a processor, or across multiple hardware units.

The modules described in this application can be stored in the non-transitory computer readable medium. The first communication unit 216, the second communication unit 236, the first control unit 212, the second control unit 234, or a combination thereof can represent the non-transitory computer readable medium. The first communication unit 216, the second communication unit 236, the first control unit 212, the second control unit 234, or a combination thereof, or a portion therein can be removable from the first device 102, the second device 106, or a combination thereof. Examples of the non-transitory computer readable medium can be a non-volatile memory card or stick, an external hard disk drive, a tape cassette, or an optical disk.

The physical transformation of the receiver signal 132 of FIG. 1 from utilizing the boosting factor estimate 140 of FIG. 1 for the communicating information results in the movement in the physical world, such as content displayed or recreated for the user on the first user device from processing the serving content therein. The content reproduced on the first device 102, such as navigation information or voice signal of a caller, can influence the user's movement, such as following the navigation information or replying back to the caller. Movement in the physical world results in changes to the channel estimates, the geographic location of the first device 102, the interference control signal 126 of FIG. 1, or a combination thereof, which can be fed back into the computing system 100 and influence the boosting factor estimate 140.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computing system comprising:
an inter-device interface configured to receive a receiver signal including an unknown boosting factor, serving control information for representing a serving control signal communicated over a serving control channel, and an interference control signal communicated over an interference control channel based on a transmission scheme; and
a communication unit, coupled to the inter-device interface, configured to:
calculate an initial factor estimate along with an initial content estimate for representing the serving control information, the initial factor estimate including a factor bias;
estimate the boosting factor based on the receiver signal and removing the factor bias from the initial factor estimate, wherein the boosting factor is for estimating in an adjustment in an amplitude of the serving control signal at a transmitting device;
determine the serving control information from the receiver signal based on the boosting factor;
calculate a control channel estimate for representing the serving control channel, the interference control channel, or a combination thereof; and
generate a refinement result based on a refinement input for representing the control channel estimate, the receiver signal, the transmission scheme, or a combination thereof.

2. The system as claimed in claim 1 wherein the communication unit is configured to:
calculate the control channel estimate based on the receiver signal for representing the serving control channel;
generate a linearization adjustment based on the control channel estimate; and
estimate the boosting factor based on the linearization adjustment.

3. The system as claimed in claim 1 wherein:
the inter-device interface is configured to receive the receiver signal for representing the serving control signal transmitted by the transmitting device and the interference control signal transmitted by a different device; and
the communication unit is configured to estimate the boosting factor including an estimate set based on a hybrid refinement mechanism for representing the boosting factor corresponding to the serving control signal and the interference control signal.

4. The system as claimed in claim 1 wherein:
the inter-device interface is configured to receive the receiver signal including a noise portion; and
the communication unit is configured to:
determine a measure magnification function for representing the serving control information relative to the noise portion, and
estimate the boosting factor based on the measure magnification function.

5. The system as claimed in claim 1 wherein:
the inter-device interface is configured to receive the receiver signal for representing the serving control signal transmitted by the transmitting device and the interference control signal transmitted by a different device; and
the communication unit is configured to generate an estimate set including:
a serving factor estimate based on a whitening mechanism for isolating the serving control signal from within the receiver signal, and
an interference factor estimate based on the whitening mechanism for isolating the interference control signal from within the receiver signal.

6. The system as claimed in claim 1 wherein:
the inter-device interface is configured to receive the receiver signal for representing the serving control signal transmitted by the transmitting device and the interference control signal transmitted by a different device; and the communication unit is configured to generate an estimate set based on a single-cell mechanism utilizing a linearization adjustment, a measure magnification function, or a combination thereof for estimating the boosting factor, based on iteratively processing one instance of the serving control signal or the interference control signal at a time, for the receiver signal.

7. The system as claimed in claim 1 wherein the communication unit is configured to estimate the boosting factor based on a direct-calculation configuration and without an iterative configuration for estimating the boosting factor from the receiver signal.

8. The system as claimed in claim 1 wherein the communication unit is configured to estimate the boosting factor without utilizing an expectation maximization approach for estimating the boosting factor from the receiver signal.

9. A method of operation of a computing system comprising:

receiving a receiver signal including an unknown boosting factor, serving control information for representing a serving control signal communicated over a serving control channel, and an interference control signal communicated over an interference control channel based on a transmission scheme;

calculating an initial factor estimate along with an initial content estimate for representing the serving control information, the initial factor estimate including a factor bias;

estimating the boosting factor with a communication unit based on the receiver signal and removing the factor bias from the initial factor estimate, wherein the boosting factor is for estimating an adjustment in an amplitude of the serving control signal at a transmitting device;

determining the serving control information from the receiver signal based on the boosting factor;

calculating a control channel estimate for representing the serving control channel, the interference control channel, or a combination thereof; and generating a refinement result based on a refinement input for representing the control channel estimate, the receiver signal, the transmission scheme, or a combination thereof.

10. The method as claimed in claim 9 further comprising:
Calculating the control channel estimate based on the receiver signal for representing the serving control channel;

generating a linearization adjustment based on the control channel estimate; and wherein:
estimating the boosting factor includes estimating the boosting factor based on the linearization adjustment.

11. The method as claimed in claim 9 wherein:
receiving the receiver signal includes receiving the receiver signal for representing the serving control signal transmitted by the transmitting device and the interference control signal transmitted by a different device; and estimating the boosting factor includes estimating the boosting factor including an estimate set based on a hybrid refinement mechanism for representing the boosting factor corresponding to the serving control signal and the interference control signal.

12. The method as claimed in claim 9 wherein:
receiving the receiver signal includes receiving the receiver signal including a noise portion; and
further comprising:
determining a measure magnification function for representing the serving control information relative to the noise portion for estimating the boosting factor based on the measure magnification function.

13. The method as claimed in claim 9 wherein:
receiving the receiver signal includes receiving the receiver signal for representing the serving control signal transmitted by the transmitting device and an interference control signal transmitted by a different device; and
estimating the boosting factor includes generating an estimate set including:
a serving factor estimate based on a whitening mechanism for isolating the serving control signal from within the receiver signal, and
an interference factor estimate based on the whitening mechanism for isolating the interference control signal from within the receiver signal.

14. A non-transitory computer readable medium including instructions for a computing system comprising:

receiving a receiver signal including an unknown boosting factor, serving control information for representing a serving control signal communicated over a serving control channel, and an interference control signal communicated over an interference control channel based on a transmission scheme;

calculating an initial factor estimate along with an initial content estimate for representing the serving control information, the initial factor estimate including a factor bias;

estimating the boosting factor based on the receiver signal and removing the factor bias from the initial factor estimate, wherein the boosting factor is for estimating an adjustment in an amplitude of the serving control signal at a transmitting device;

determining the serving control information from the receiver signal based on the boosting factor;

calculating a control channel estimate for representing the serving control channel, the interference control channel, or a combination thereof; and generating a refinement result based on a refinement input for representing the control channel estimate, the receiver signal, the transmission scheme, or a combination thereof.

15. The non-transitory computer readable medium as claimed in claim 14 further comprising:
calculating the control channel estimate based on the receiver signal for representing the serving control channel;

generating a linearization adjustment based on the control channel estimate; and wherein:
estimating the boosting factor includes estimating the boosting factor based on the linearization adjustment.

16. The non-transitory computer readable medium as claimed in claim 14 wherein:
receiving the receiver signal includes receiving the receiver signal for representing the serving control signal transmitted by the transmitting device and the interference control signal transmitted by a different device; and
estimating the boosting factor includes estimating the boosting factor including an estimate set based on a hybrid refinement mechanism for representing the boosting factor corresponding to the serving control signal and the interference control signal.

17. The non-transitory computer readable medium as claimed in claim 14 wherein:
receiving the receiver signal includes receiving the receiver signal including a noise portion; and
further comprising:
determining a measure magnification function for representing the serving control information relative to the noise portion for estimating the boosting factor based on the measure magnification function.

18. The non-transitory computer readable medium as claimed in claim 14 wherein:
receiving the receiver signal includes receiving the receiver signal for representing the serving control signal transmitted by the transmitting device and an interference control signal transmitted by a different device; and
estimating the boosting factor includes generating an estimate set including:
  a serving factor estimate based on a whitening mechanism for isolating the serving control signal from within the receiver signal, and
  an interference factor estimate based on the whitening mechanism for isolating the interference control signal from within the receiver signal.

* * * * *